US011593132B1

(12) United States Patent
Rane et al.

(10) Patent No.: US 11,593,132 B1
(45) Date of Patent: Feb. 28, 2023

(54) SNAPSHOT CAPTURE OF COMPUTING DEVICE USER INTERFACES

(71) Applicant: Ironclad, Inc., San Francisco, CA (US)

(72) Inventors: Parimal Rane, Indianapolis, IN (US); Michael Welling, Indianapolis, IN (US)

(73) Assignee: Ironclad, Inc., San Francisco, CA (US)

( * ) Notice: Subject to any disclaimer, the term of this patent is extended or adjusted under 35 U.S.C. 154(b) by 0 days.

(21) Appl. No.: 17/731,192

(22) Filed: Apr. 27, 2022

(51) Int. Cl.
| | | |
|---|---|---|
| *G06F 9/451* | (2018.01) | |
| *G06F 9/455* | (2018.01) | |
| *G06F 16/11* | (2019.01) | |
| *G06F 3/0481* | (2022.01) | |
| *G06F 3/0484* | (2022.01) | |
| *G06F 40/174* | (2020.01) | |

(52) U.S. Cl.
CPC ............ *G06F 9/451* (2018.02); *G06F 3/0481* (2013.01); *G06F 3/0484* (2013.01); *G06F 9/45558* (2013.01); *G06F 16/128* (2019.01); *G06F 40/174* (2020.01); *G06F 2009/45562* (2013.01)

(58) Field of Classification Search
CPC ...... G06F 9/451; G06F 16/128; G06F 40/174; G06F 9/45558; G06F 2009/45562; G06F 3/0481; G06F 3/0484
See application file for complete search history.

(56) References Cited

U.S. PATENT DOCUMENTS

| | | | | |
|---|---|---|---|---|
| 9,146,769 B1* | 9/2015 | Shankar | ................... | H04L 67/10 |
| 9,396,200 B2* | 7/2016 | Jacoby | ................... | G06F 11/079 |
| 9,524,389 B1* | 12/2016 | Roth | ................... | G06F 9/45558 |
| 2002/0174010 A1* | 11/2002 | Rice, III | ............... | G06F 16/182 |
| | | | | 705/14.67 |
| 2013/0263114 A1* | 10/2013 | Watkins | .............. | G06F 9/45558 |
| | | | | 718/1 |
| 2016/0147609 A1* | 5/2016 | Wallace | ................ | G06F 16/128 |
| | | | | 707/647 |
| 2016/0378527 A1* | 12/2016 | Zamir | ................. | G06F 9/45558 |
| | | | | 711/162 |
| 2016/0378528 A1* | 12/2016 | Zamir | ................... | G06F 3/0679 |
| | | | | 711/162 |
| 2017/0147446 A1* | 5/2017 | Zhang | ................... | G06F 3/0646 |
| 2019/0324676 A1* | 10/2019 | Bensberg | .............. | G06F 3/0604 |
| 2019/0370124 A1* | 12/2019 | Sadavarte | ........... | G06F 11/1469 |
| 2020/0008978 A1* | 1/2020 | Boncyk | ................... | A63F 13/35 |

(Continued)

OTHER PUBLICATIONS www.smarsh.com (May 3, 2022).

(Continued)

*Primary Examiner* — Tadesse Hailu

(74) *Attorney, Agent, or Firm* — Banner & Witcoff, Ltd.

(57) ABSTRACT

Various aspects of the subject technology relate to systems, methods, and machine-readable media for automating the recording of an evidentiary history (e.g., versions audit trail) of a graphical user interface with an embedded clickwrap agreement. The snapshot server captures and outputs snapshot records of a graphical user interface displaying the clickwrap agreement on an end user computing platform. The snapshot records are created using a virtual machine that emulates an end user computing platform for navigation of an application rendered on the platform. Aspects may also include generating a snapshot record of metadata associated with the captured snapshot image.

20 Claims, 19 Drawing Sheets

(56) References Cited

U.S. PATENT DOCUMENTS

2020/0233542 A1* 7/2020 Breedvelt-Schouten .................... G06F 3/0484

OTHER PUBLICATIONS www.Stillio.com (May 3, 2022).
ChangeTower.com (May 3, 2022).
www.Sken.io_website (May 3, 2022).
www.Capterra.com_website (May 3, 2022).
www.mirrorweb.com_website (May 3, 2022).

* cited by examiner

Custom Headers

Header 1

Name x-distil-secure

Value abcde-1234

+ Add Header

Instructions

Load

URL https://www.donothingfor2minutes.com

1  Wait

Time (sec)

5

+ Add Instruction

Capture Snapshot

FIG. 10B

SNAPSHOT CAPTURE OF COMPUTING DEVICE USER INTERFACES

TECHNICAL FIELD

The present disclosure generally relates to electronic platforms for capturing snapshots of graphical user interfaces, and more particularly to automatic capture of snapshots of clickwrap agreements based on virtual emulation of an electronic, computing device.

BACKGROUND

Computing devices such as smartphones and personal computers can be used to capture pictures of a display screen, such as to capture a snapshot of a graphical user interface (GUI) rendering data of an application, screen, page, document, and/or the like. The captured snapshots can be used to represent how a particular display screen and/or GUI appeared to a user at a particular point in time, such as being a visual representation of the screen and/or GUI and including associated metadata. Such a snapshot can be particularly useful in circumstances when the appearance of a GUI at a particular moment in time is of import, or when there is a need to know what a user was viewing when a transaction took place, among other needs. GUI's are often modified, and knowing how a GUI appeared at a pinpointed time in the past is often impossible, without a technical solution designed to capture it. For example, captured snapshots can graphically indicate how a webpage or application screen appeared to a particular user when a transaction occurred or an agreement was entered into. The captured snapshots may then be used, for example, to graphically represent what the particular user viewed on the webpage when the webpage is used to conduct the transaction. This graphical representation can be useful as evidence or an evidentiary exhibit, such as during a legal proceeding associated with the transaction, or for a variety of other documentary or other purposes. However, no existing platforms provide the aforementioned functionality in a reliable, scalable, secure, and efficient way for purposes of evidentiary proof of an end user's acceptance of contract terms.

SUMMARY

Various aspects of the subject technology relate to systems, methods, and machine-readable media for recording an evidentiary history of a clickwrap agreement embedded in a graphical user interface (GUI) of an end user computing platform by associating an acceptance event by an end user with a previously-generated snapshot record comprising snapshot metadata and a snapshot image, wherein the clickwrap agreement is associated with a contract group. The method may comprise steps to setup a clickwrap agreement using a contract group and one or more snapshot configurations associated with the contract group; then emulate an end user computing platform using a virtual machine to capture snapshot records according to the snapshot configurations; and then at a later time, associate acceptance events of an end user accepting the clickwrap agreement with the appropriate snapshot record previously captured using the virtual machine.

In one embodiment involving a method for recording an evidentiary history of a clickwrap agreement, the method for setting up a clickwrap agreement using a contract group and one or more snapshot configurations associated with the contract group may include numerous steps. For example, a snapshot configuration, which is associated with a contract group, may be populated with parameters comprising: at least one of a snapshot frequency or a triggering acceptance event for the clickwrap agreement, a type of the end user computing platform, an operating system of the end user computing platform, a location where a contract group element (e.g., a snapshot configuration key) is embedded, navigation instructions, and/or other parameters. The method may also include a step of generating the contract group element (e.g., a snapshot configuration key) configured to be embedded on a page that, when rendered by the end user computing platform, causes the graphical user interface of the end user computing platform (i.e., visual graphics and text on the screen of the end user computing platform) to display the clickwrap agreement (i.e., displaying the contents of the clickwrap agreement or even a link that causes the content of clickwrap agreement to be displayed). One or more of the preceding method steps may be conflated, divided, or omitted as appropriate.

In an embodiment involving a method for recording an evidentiary history of a clickwrap agreement, the method for emulating an end user computing platform using a virtual machine to capture snapshot records according to the snapshot configurations may include numerous steps. For example, a snapshot time may be determined based on the snapshot frequency or the triggering acceptance event. The snapshot time may be used to initiate capture of the snapshot image, wherein the snapshot image includes a visual representation of the graphical user interface including the clickwrap agreement. The method for capturing snapshot records using an emulated end user computing platform using a virtual machine may further include: creating a virtual machine that emulates the end user computing platform in adherence with the parameters of the snapshot configuration; executing, via the virtual machine at the snapshot time, the navigation instructions configured to be executed via the emulated end user computing platform; capturing, based on the executing the navigation instructions at the snapshot time, the snapshot image of the graphical user interface on the emulated end user computing platform; generating a snapshot record comprising the snapshot image and snapshot metadata associated with the emulated end user computing platform adhering to the parameters of the snapshot configuration; and/or storing the snapshot record in a data store. One or more of the preceding method steps may be conflated, divided, or omitted as appropriate.

In an embodiment involving a method for recording an evidentiary history of a clickwrap agreement, the method for associating, at a time later than the snapshot time, acceptance events of an end user accepting the clickwrap agreement with the appropriate snapshot record previously captured using the virtual machine may include numerous steps. For example, in response to the end user accepting (e.g., by checking a checkbox on the GUI) the clickwrap agreement, receiving an acceptance event at a time that is after the snapshot time, wherein the acceptance event comprises acceptance metadata of an end user computing device of the end user. The method for associating acceptance events of an end user accepting the clickwrap agreement with the appropriate previously-generated snapshot record may further include: identifying the snapshot configuration associated with the contract group associated with the clickwrap agreement and based on the parameters matching the acceptance metadata; and/or associating the acceptance event with a last-captured snapshot record of the previously-generated snapshot record that is associated with the identified snapshot configuration, wherein the last-captured snapshot record is chronologically closer after the snapshot time than any previously-generated snapshot record. One or more of the preceding method steps may be conflated, divided, or omitted as appropriate.

Various aspects of the subject technology relate to systems, methods, and machine-readable media for setting up a computing system such as a snapshot computing platform to trigger capture (e.g., periodic capture) of a snapshot record (e.g., visual representation and associated metadata) of a graphical user interface (GUI), such as via virtual emulation of a computing device associated with the GUI. Periodic capture can refer to automation of a cadence or frequency of how often the snapshot should be automatically taken. As an example, the frequency trigger can be daily, weekly, monthly, or some other frequency. The snapshot record may be captured based on a user setting up a snapshot configuration, such as via username, email, password, URL, and/or other navigation credentials for accessing the GUI. The snapshot configuration may refer to instructions for specifying details relevant to automated snapshot capture, such as cadence, page URL, screen, native application name, SNAPSHOTS™ platform, etc. As an example, the navigation credentials may involve virtual emulation of a mobile device on a server. The periodic capture of snapshots can be based on reading a snapshot configuration. The snapshot computing platform may also be used to take a snapshot of the GUI or some other interface based on user defined specifications, such as a user defined time when one or more aspects (e.g., GUI layout) of the GUI have changed.

In particular, the frequency trigger and/or snapshot configuration of the snapshot computing platform can be changed to capture changes in details of the GUI that have contractual implications. As an example, a captured snapshot showing terms and conditions of a contractual agreement can be linked to a particular contract group. The snapshot configuration may include information about how to access the terms (e.g., terms of service) and conditions, such as for a commercial transaction with an online merchant. For example, the snapshot configuration can include the cadence, a page uniform resource locator (URL), a native mobile application name, a computing device platform where the snapshot is to be taken, and/or the like. A job scheduler and runner can be configured to asynchronously trigger the snapshot to be taken based on the runner reading the snapshot configuration. In this way, navigation of the mobile application or computing device platform, such as via a creation of a virtual machine that emulates the application or platform, can be performed automatically to obtain the particular GUI that should be the subject of the periodically captured snapshot. The captured snapshot can be evidence of what a particular user encountered on the GUI during a contractual transaction (e.g., agreed terms and conditions), for example.

The captured snapshot can be uploaded to cloud storage. Moreover, metadata corresponding to the captured snapshot—the snapshot record—can be used to update an associated contract group. In this way, the associated contract group may indicate new activity corresponding to a last successfully captured snapshot, such as including the uploaded snapshot location, timestamp, and reference to other metadata. For example, the uploaded snapshot location may be associated to an actual contract acceptance event, such as represented by the last successfully captured snapshot. Additionally or alternatively, acceptance of contract terms reflected by the contract acceptance event can be linked to either an image path or a reference to a snapshot configuration for retrieval of the snapshot record via a timestamp. The metadata can also be used as evidence of legal terms presented at the relevant time when the particular user was interacting with the particular legal agreement displayed/represented on the particular GUI. This may enable the periodically taken snapshots (e.g., snapshot images) to form a snapshot record that can be associated with a corresponding contract group identifier. As an example, the snapshot record may be generated in portable document format (PDF) or any other appropriate format that ensures the immutability of the record's contents. Advantageously, the contract acceptance and other contract information automatically may be periodically captured and updated with snapshots on a corresponding webpage or application page accessed and navigated via the virtual machine that emulates the hosting application, browser, or computing platform that renders the page (that is subject to the periodically captured snapshots).

According to one embodiment of the present disclosure, a computer-implemented method for outputting snapshots of a graphical user interface is provided. The method includes generating a snapshot configuration associated with a contract group element (e.g., a snapshot configuration key) published to a computing platform. The method also includes determining, based on a snapshot frequency parameter or a trigger associated with the snapshot configuration, a time to capture a snapshot of the graphical user interface of the computing platform. The method also includes creating a virtual machine that emulates the computing platform for navigation of an application rendered on the computing platform. The method also includes determining information associated with the snapshot configuration. The method also includes executing, via the virtual machine and based on the information, instructions that are executable via the computing platform. The method also includes capturing, based on executing the instructions, the snapshot of the graphical user interface. The method also includes generating, based on capturing the snapshot, a snapshot record comprising metadata associated with the snapshot.

According to one embodiment of the present disclosure, a system is provided including a processor and a memory comprising instructions stored thereon, which when executed by the processor, cause the processor to perform a method for outputting snapshots of a graphical user interface. The method includes generating a snapshot configuration associated with a contract group element (e.g., a snapshot configuration key) published to a computing platform. The method also includes determining, based on a snapshot frequency parameter or a trigger associated with the snapshot configuration, a time to capture a snapshot of the graphical user interface of the computing platform. The method also includes creating a virtual machine that emulates the computing platform for navigation of an application rendered on the computing platform. The method also includes determining information associated with the snapshot configuration. The method also includes executing, via the virtual machine and based on the information, instructions that are executable via the computing platform. The method also includes capturing, based on executing the instructions, the snapshot of the graphical user interface. The method also includes generating, based on capturing the snapshot, a snapshot record comprising metadata associated with the snapshot.

According to one embodiment of the present disclosure, a non-transitory computer-readable storage medium is provided including instructions (e.g., stored sequences of instructions) that, when executed by a processor, cause the processor to perform a method for outputting snapshots of a graphical user interface. The method includes generating a snapshot configuration associated with a contract group element (e.g., a snapshot configuration key) published to a computing platform. The method also includes determining, based on a snapshot frequency parameter or a trigger associated with the snapshot configuration, a time to capture a snapshot of the graphical user interface of the computing platform. The method also includes creating a virtual machine that emulates the computing platform for navigation of an application rendered on the computing platform. The method also includes determining information associated with the snapshot configuration. The method also includes executing, via the virtual machine and based on the information, instructions that are executable via the computing platform. The method also includes capturing, based on executing the instructions, the snapshot of the graphical user interface. The method also includes generating, based on capturing the snapshot, a snapshot record comprising metadata associated with the snapshot.

According to one embodiment of the present disclosure, a computer-implemented method for outputting snapshots of a graphical user interface is provided. The method includes generating a snapshot configuration associated with a contract group element (e.g., a snapshot configuration key) published to a computing platform. The method also includes determining, based on a snapshot frequency parameter or a trigger associated with the snapshot configuration, a time to capture a snapshot of the graphical user interface of the computing platform. The method also includes creating a virtual machine that emulates the computing platform for navigation of an application rendered on the computing platform. The method also includes navigating to a screen (e.g., login page, anchor page) of the application via the virtual machine to access the graphical user interface. The method also includes selecting an application function based on the virtual machine emulating physical hardware corresponding to the computing platform. The method also includes determining information associated with the snapshot configuration. The method also includes executing, via the virtual machine and based on the information, instructions that are executable via the computing platform. The method also includes capturing, based on executing the instructions, the snapshot of the graphical user interface. The method also includes generating, based on capturing the snapshot, a snapshot record comprising metadata associated with the snapshot. The method also includes associating the snapshot record with the contract group element (e.g., a snapshot configuration key).

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 9A and FIG. 9B (collectively "FIG. 9") show example settings pages shown to an administrative user of an example SNAPSHOTS™ platform, according to certain aspects of the present disclosure.

FIG. 10A and FIG. 10B (collectively "FIG. 10") show example commands builders of an example SNAPSHOTS™ platform, according to certain aspects of the present disclosure.

Figure 1:
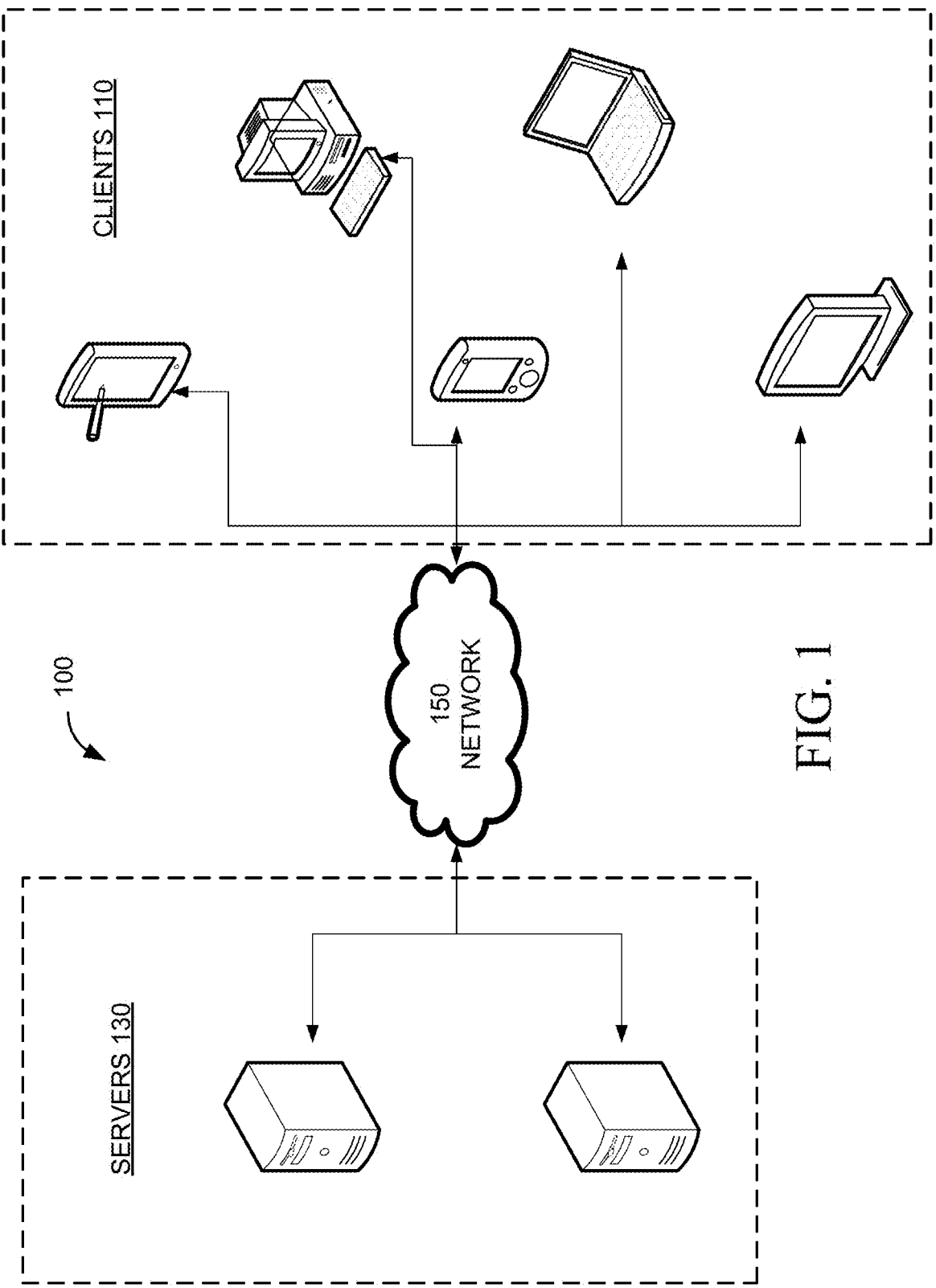
FIG. 1 is a block diagram of a device operating environment with which aspects of the present disclosure can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Introduction to the SNAPSHOTS™ Platform.

The disclosed systems, methods, and machine-readable media, among other things, automate the recording of an evidentiary history (e.g., version audit trail) of a clickwrap agreement embedded in a graphical user interface of an end user computing platform by associating an acceptance event by an end user with a previously-generated/outputted snapshot record. The snapshot record memorializes the visually representative content and environment of the online clickwrap agreements at about the time of an end user's acceptance of the clickwrap agreement. While platforms exist that can save HTML document object model (DOM) events from users and then replay those events to attempt to create reconstructions of the user's session, these reconstructions are not always reliable and/or scalable for all users' representations of the screen visible for all users accessing the flow. Meanwhile, other platforms exist that attempt to create reconstructions using a reactive approach that hope the Wayback Machine (or comparable archiving service) happened to take a screenshot of the web page on the date in question or relying on software engineers to crawl back through GitHub commits to recreate the screen the end user would have seen on the date in question. In addition, such platforms typically do not tie the user's acceptance of clickwraps to the reconstructions. Moreover, such platforms typically are handling a single (or just a few) static clickwrap agreements and not dynamically generated clickwrap agreements based on the characteristics of the end user (e.g., language preference, locale designation, user accessibility settings, pop-up ad blocker activated, etc.), thus typically need not be concerned about scalability and on-the-fly decision-making. Generally, there is an inability to reliably and scalably audit the content/version of the online clickwrap agreement at the user's acceptance.

The captured snapshot records may be used to visually represent how a particular display screen and/or GUI appeared to a user at a particular point in time, such as when the user agrees to a legally binding agreement. Such a snapshot can be particularly useful in circumstances when the appearance of a GUI at a particular moment in time is of import, or when there is a need to know what a user was viewing when a transaction took place, among other needs. The captured snapshots can graphically indicate how a webpage or application screen appeared to a particular user when a transaction occurred or an agreement was entered into. This graphical representation can be useful as evidence or an evidentiary exhibit, such as during a legal proceeding associated with the transaction, or for a variety of other documentary or other purposes. While other tools have existed that perform screen captures, the system disclosed herein includes numerous innovative aspects.

The disclosed systems, methods, and machine-readable media, among other things, may be configured to capture and store snapshot records evidencing clickwrap agreements without necessarily requiring the capture time of the snapshot image to be the same as the end user's acceptance of the clickwrap agreement. Instead, at the time of the end user's acceptance of the clickwrap agreement, the last captured snapshot record with recorded snapshot metadata matching the metadata of the end user's computing device at the time of acceptance is associated with the acceptance record without needing to create a new snapshot image or snapshot record. For example, a snapshot server captures snapshot images of one or more GUIs at a time of capture (i.e., captured_time) and creates snapshot records at a time of creation (i.e., created_time), and then stores them in a data store/repository.

Moreover, although numerous examples describe snapshot images being captured and created by a snapshot server, the disclosed innovation is not so limited. Rather, snapshot images and snapshot metadata may be captured by a device or system apart from the snapshot server and then transmitted to the snapshot server for uploading and/or saving with other snapshot records. For example, a third-party, external service provider that is authenticated and trusted may capture snapshot records and transmit them to a snapshot server for storing. Alternatively, the snapshot image may be captured in a manual process triggered by an end user's actions or by an administrative user, and the snapshot image and snapshot metadata may be captured at an actual end user's client computing device in a secure manner, then uploaded to a snapshot server for storing as a snapshot record. In such an example, the capture_time may be noticeably earlier than a created_time because of, for example, a network delay or other operating environment delay between the capture of the screenshot and the snapshot record creation. Moreover, the end user's client computing device may be equipped in such examples with software modules to perform the aforementioned steps in a secure and reliable way so as to ensure the integrity of the snapshot image and snapshot metadata captured.

As apparent after review of the description herein, the innovative approach disclosed herein of capturing and saving representative GUI screenshots has numerous technological benefits including, but not limited to offloading the capture of snapshot records to virtual machines on a server so that the burden/load on the end user computing device (and even web server) is reduced. Furthermore, depending on the cadence/frequency of the capture of snapshot records, there may be noticeable savings in memory storage consumed over other approaches for recording evidence. Moreover, the burden on the overall client-server system at execution time is reduced because capture of an image of the graphical user interface (GUI) on the end user computing device need not be captured at the same time as when the end user is accepting the clickwrap agreement (and the clickwrap agreement is being rendered/delivered). In addition, the pre-acceptance capture of snapshot records enables auditing (automated and/or manual) of GUIs rendering clickwrap agreements to potentially catch errors on the page/application before end users encounter them.

The snapshot server enables automated, third-party systems to collect the evidentiary records that are desirable to reduce allegations of bias from the evidence collection process. Moreover, because snapshot images are stored in a data store, processes can be performed on the data store to effect savings in storage memory—e.g., a background process may execute to clean-up snapshot records so that duplicate/substantially duplicate snapshot records can be eliminated and be assigned more than one snapshot time (i.e., the time of the snapshot image capture). For example, two chronologically adjacent snapshots may be compared with a pixel-by-pixel image comparison of their snapshots images to determine if the two snapshots are substantially representative of each other; and if they are, then one of the duplicate snapshot images may be deleted. Then, the remaining snapshot image may be linked to both of the snapshot records and their associated metadata. In other examples, the snapshot records may be coalesced or consolidated in other ways to reduce the memory storage burden.

In addition, the disclosed systems, methods, and machine-readable media address a problem in traditional computing systems for obtaining snapshots of GUIs, namely snapshots of user interfaces of non-static websites. One problem associated with obtaining such snapshots is that conventional systems merely take a screenshot of static websites at a static URL. It may be difficult or impossible for such conventional systems to automatically navigate through a series of webpages, web sites, or user interface screens (e.g., for modeling an online transaction or interaction) and/or automatically take screenshots. This is a problem specifically arising in the realm of computer technology. The problem is addressed by providing a solution also rooted in computer technology, namely, by providing a SNAPSHOTS™ platform or framework that automates complex navigation of an application or series of computer generated pages for identifying/determining where and when to take a GUI snapshot.

For example, the solution may improve conventional computing systems by providing a mechanism to emulate navigation via the application or series of computer generated pages to identify the GUIs that a user desires to obtain snapshots or screenshots of such as commercially significant pages/screens. As an example, the mechanism can be used to obtain evidence of what terms and conditions were presented to a contractual party that is party to a commercial transaction conducted at least partially online or on a computer. As an example, the mechanism may involve creation of a virtual machine such as a virtual machine on a particular type of server that emulates execution of a particular type of computing platform. The virtual machine may enable execution (e.g., simulated navigation) of the application or the series of pages, such as downloading the application, logging in, navigation through the series of pages, and/or the like. In this way, the solution of the present disclosure enables filtering through applications or plurality of pages (e.g., webpages) to select, navigate, and/or control one or more GUI screens for automatically capturing snapshots or screenshots. As used herein, a snapshot can refer to a visual representation such as a time indexed screen capture, screen grab, screenshot, etc. Accordingly, the provided solution reduces delay in automatically capturing snapshots, increases processing speed, enables snapshots of pages or application screens that require complex navigation, and other advantages.

The SNAPSHOTS™ platform may be configured to automate snapshots for webpages and native applications for various hardware platforms (e.g., computing platforms, runners, etc.) depending on which runner is specified by the user and/or corresponding platform used by the user. The SNAPSHOTS™ platform may use the created virtual machine to run commands tailored for the specified platform, such as an Apple iPhone® operating system (iOS®), Android™ operating system, Google Chrome browser, and/or the like. The runner of the SNAPSHOTS™ platform can read various snapshot configurations and invoke the appropriate virtual machine/emulation that emulates operation (e.g., scripts) of the webpages or native applications. As an example, the virtual machine emulation can be invoked via a computing service such as AWS Lambda available from Amazon Web Services, Inc. of Seattle, Wash. or a test automation framework for executing commands via the virtual machine emulation. In this way, the SNAPSHOTS™ platform advantageously can navigate through components or constituent screens of the webpages and native applications for setting snapshot cadences (snapshot trigger frequencies), capturing snapshots of desired GUIs, updating metadata associated with captured snapshots, and sending/uploading the captured snapshot and/or metadata to remote storage (e.g., cloud storage).

Illustrative Computational Operating Environment

FIG. 1 is a block diagram of a device operating environment with which aspects of the present disclosure can be implemented. FIG. 1 illustrates an exemplary network architecture 100 to provide a SNAPSHOTS™ platform for outputting snapshots of a GUI, according to some embodiments. The servers 130 can include computing frameworks for invoking a virtual machine used to emulate a hardware platform web browser, mobile browser, native mobile application, etc. The hardware platform may be used to render interfaces or screens being navigated through and selected as GUIs for triggering capture of snapshots. The servers 130 may invoke the virtual machine to control, access, maintain, and/or otherwise navigate through components of webpages, browsers, or applications to access one or more GUIs showing terms and conditions of a contract agreement, for example. In this way, the virtual machine can facilitate automatic navigation and capture of GUIs that can function as evidence of the terms and conditions shown to a contractual party for a contractual transaction that was conducted.

The client devices 110 can be a computing device that selects the webpages, browsers, applications, and/or GUIs for conducting the contractual transaction or other type of interaction. For example, the webpages, browsers, applications, and/or GUIs can be rendered on an internet browser or a native application executable by computing devices. The browser or application may be hosted or accessed on a network such as the network 150, which may be the Internet. GUIs selected for automatic capture of snapshots may be accessed in an online or offline manner via the network 150 such as via an identifier (e.g., web address, website, uniform resource location (URL)) of a website/webpage on the World Wide Web (WWW) accessible via the Internet or via a native application on the client devices 110 (e.g., a native smartphone application downloaded from an application store). The offline manner may involve accessing a cached, previously saved offline version of the content platform, for example.

The network architecture of FIG. 1 includes one or more client devices 110 and one or more servers 130 which are communicatively coupled through the network 150. The network 150 may include a wired network (e.g., via fiber optic or copper wire, telephone lines, and the like) or wireless network (e.g., a cellular network, radio-frequency (RF) network, Wi-Fi, Bluetooth, and the like). The client devices 110 may be any one of a mobile device, a laptop, a desktop, a tablet (e.g., palm or pad) device, a television, a display device, and/or the like. The client devices 110 can be controlled by a user (e.g., an administrative user) to receive snapshot records and to select snapshot settings for the snapshot records, such as timing, and frequency, and what computing platform is used to capture snapshots. The client devices 110 may also be used to define what GUIs should be subject to automatic taking of snapshots. In general, the client devices 110 may receive user input to define what commands or other settings should be configured for capturing snapshots. The client devices 110 may have access to the SNAPSHOTS™ platform hosted by the servers 130 via an online or offline connection, such as a wireless connection, wired connection, ad hoc connection, mobile connection, satellite connection, and/or the like. Each of the servers 130 may be a computing device such as part of a cloud computing server including one or more desktop computers or panels mounted on racks, and/or the like. The panels may include processing boards and also switchboards, routers, and other network devices.

Figure 2A:
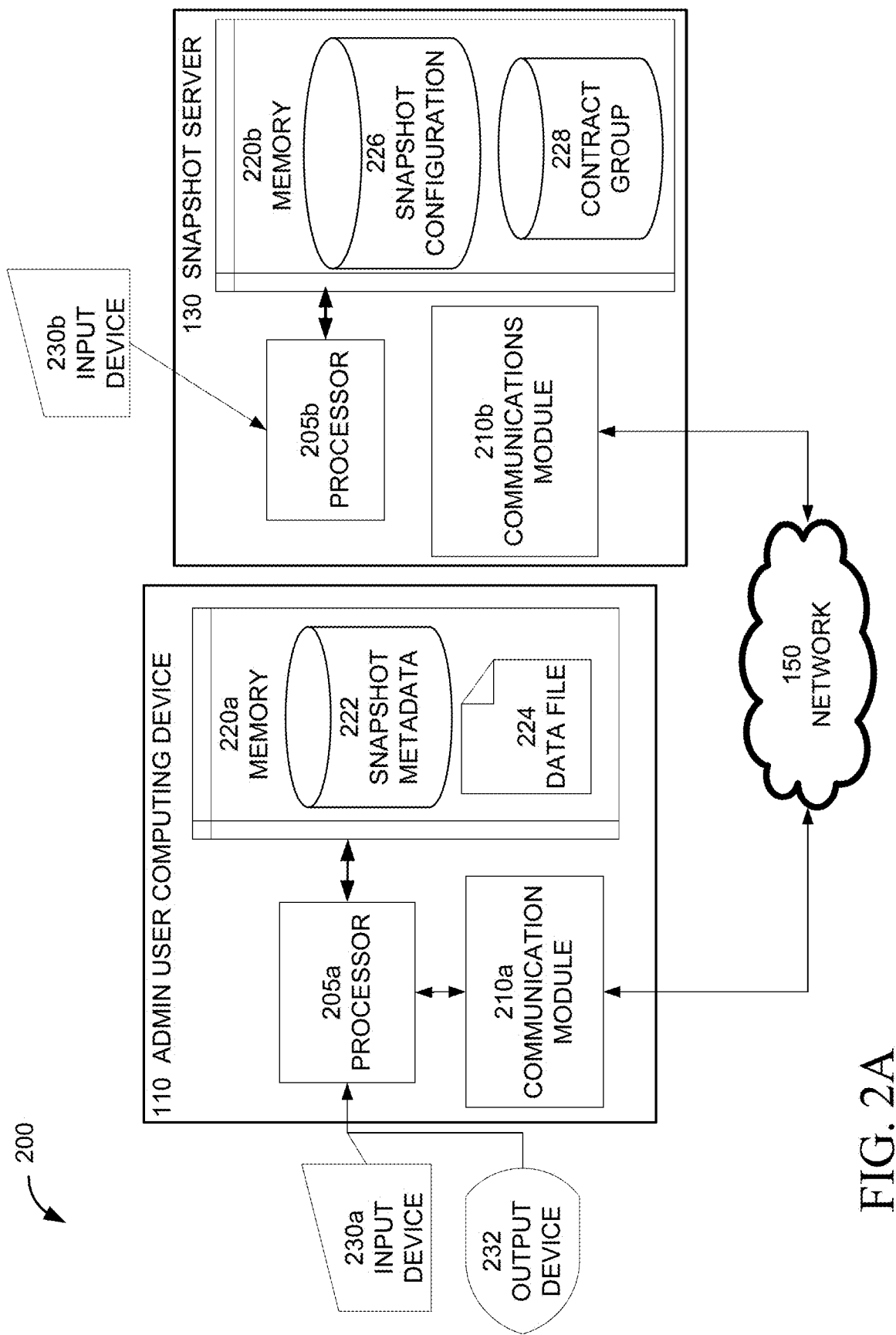
FIG. 2A and FIG. 2B (collectively "FIG. 2") are block diagrams of illustrative computing networks of an example SNAPSHOTS™ platform for outputting snapshots of a graphical user interface, according to certain aspects of the present disclosure.

FIG. 2 is a block diagram of an example computing network 200 of an example SNAPSHOTS™ platform for outputting snapshots of a graphical user interface, according to certain aspects of the present disclosure. FIG. 2A illustrates a client device (of one or more client devices) 110 and a server (of one or more servers) 130 of the example computing network 200 for use in the network architecture of FIG. 1, according to some embodiments. Each of the one or more client devices 110 and the one or more servers 130 may access each other and other devices in the network 150 via corresponding communications modules 210a-210b. The communications modules 210a-210b may each include radio hardware and software such as RF antennas, analog circuitry, digital to analog conversion circuits, digital signal processing circuitry, and/or the like. The client device 110 and server 130 depicted in FIGS. 1-2 may each include a processor 205a-205b and memory 220a-220b, respectively.

Generally, the client device 110 and the server 130 comprise computing devices including at least: the memory 220a-220b storing instructions and the processors 205a-205b configured to execute the instructions to perform, at least partially, one or more steps as described in methods disclosed herein. For example, the memory 220a of the client device 110 may be used to gain access to a browser, application, or device component corresponding to the SNAPSHOTS™ platform hosted by the server 130. The client device 110 may be used by an administrative user (e.g., not a typical end user) of the SNAPSHOTS™ platform, such as to configure commands, select settings, and/or define GUIs that should be identified as screens for automatic capture of snapshots by the SNAPSHOTS™ platform. Additionally or alternatively, snapshot metadata settings may be stored in the database 222.

The client device 110 may be coupled to at least one input device 230a and output device 232 accessible by the user (e.g., for user input and output perceivable by the user). The input device 230a can include a mouse, keyboard, a pointer, a stylus, a touchscreen display, microphone, voice recognition software, graphical user interface (GUI), and/or the like. Similarly, the input device 230b of the server 130 can be used to define functionality and/or framework aspects of the SNAPSHOTS™ platform. The output device 232 can include a display (e.g., the same touchscreen display as the input device), a speaker, an alarm, and the like.

The data file 224 stored in the memory 220a of the client device 110 can include application or browser settings, files, and data specific to the associated user of the client device 110, such as snapshot record preferences, command builders, snapshot settings, and/or the like corresponding to the associated user's account on the SNAPSHOTS™ platform and/or the associated user's native application or webpages. The data files 224 can contain data indicative of an application programming interface (API) call. The API call of the data files 224 may be used to create and save snapshot configurations. The API call may also be used to associate (e.g., attach or otherwise link) created snapshot configurations to a desired contract group via a user interface (e.g., via the input device 230a) of the client device 110. Association of a specific snapshot configuration to a specific contract group may enable automatic capture of snapshots according to user configuration settings, such as what GUIs to take snapshots of, what metadata should be included in the corresponding snapshot record, how frequently snapshots should be taken, and/or the like. As an example, association may cause any new activity for the specific contract group (e.g., update to terms and conditions of the contractual agreement) with a latest captured snapshot such that a snapshot record can have a representative snapshot image of captured acceptance data (e.g., each instance of contractual terms and conditions prior to a subsequent update). The created snapshot configurations and contract groups created via the client device 110 may be stored in the database 226 and the database 228, respectively.

Although the above description describes certain functions being performed by the processor 205a of the client device 110 and other certain functions being performed by the processor 205b of the server 130, all of the functions described herein can be performed by the client device 110 and/or the server 130 in some other alternative division of labor. That is, the processors 205a, 205b could perform more or less of the functions (e.g., portions of the machine learning algorithm and/or image processing) described above. In some embodiments, some or part of the client device 110 can be co-located with the server 130. That is, the server 130 can be remote from or both the client device 110 and the server 130 can be part of the same larger computing system, network, or architecture.

The server 130 can include a mobile or web software development kit (SDK) for implementing automatic snapshot functionality and this SDK could be stored in the memory 220b which generally stores snapshot configuration information. The snapshot configuration information can include user provided builds of corresponding web and native applications that render GUIs which are the subject of automatic snapshot capture by the SNAPSHOTS™ platform. The user provided builds can be stored in the database 226 and used to facilitate virtualized emulation, such as via creation of a virtual machine by the server 130. The virtual machine can be used to virtually navigate and/or simulate navigation of the corresponding web and native applications to access the GUIs used for taking snapshots. As an example, the virtual machine may be used to conduct a commercially significant transaction or interaction on the corresponding web and native applications, including steps such as downloading the corresponding applications from an application store, logging into the application, selecting settings, and/or navigating through screens of the application (e.g., screens representative of making/checking out for a purchase via the corresponding applications).

For automation of the snapshot capture, the server 130 may be configured to create one or more snapshot configurations. As an example, the snapshot configuration can define where a snapshot and snapshot record should be sent to. The snapshot configuration can define other parameters of the snapshot record, such as cadence, target URL (e.g., of a webpage), credential information, navigation information, and/or the like. The snapshot configuration may be created based on what type of computing platform the snapshot is intended to capture GUIs displayed on. For example, the computing platform for rendering the GUIs may be or include a personal computer, a mobile computing device (e.g., smartphone, tablet, etc.), a web browser, mobile browser, native mobile application, and/or the like. Each snapshot configuration that is created can be associated with a contract group that is published to the computing platform. The contract group can be a representation of the commercial significant interaction, such as by comprising data of a contract including terms and conditions from a public website, for example. The contract groups can be stored in the database 228. The server 130 may also comprise modules or components such as a job scheduler (e.g., a CRON worker service), a runner, a webhook, and/or the like. In this way, the server can update snapshot records with captured snapshots and associated metadata as well as associate corresponding contract groups with recently captured snapshots (e.g., a last successfully captured snapshot).

Figure 2B:
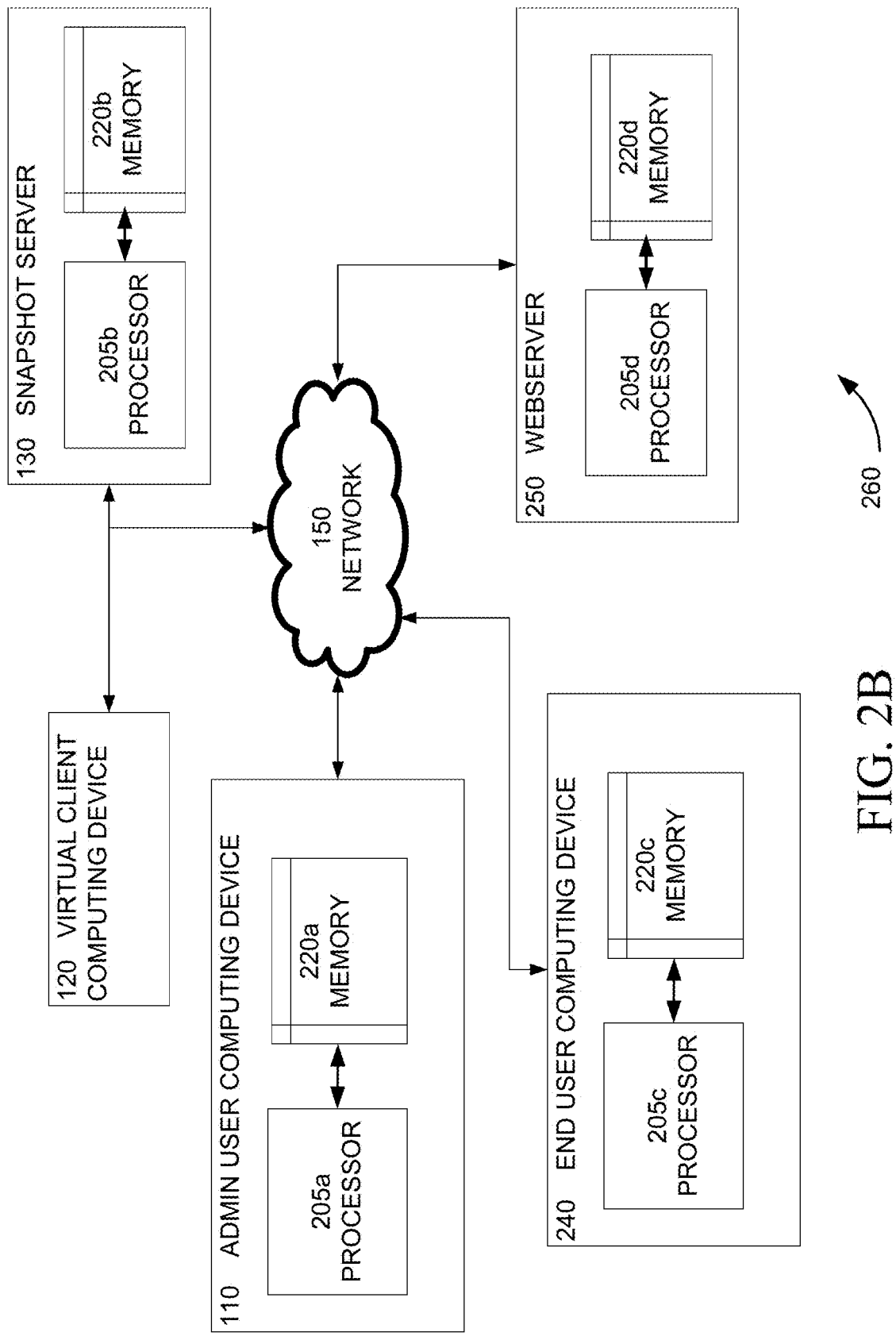

FIG. 2B is a block diagram of an example computing network 260 of an example SNAPSHOTS™ platform for outputting snapshots of a graphical user interface, according to certain aspects of the present disclosure. The processor 205c of the end user/client computing device 240 may be used to operate the client device 240, such as to execute applications and functions thereof rendered on the client device 240. The functions can include sending client user inputs to the server 130 to define various parameters and settings for capturing snapshots and associated information by the SNAPSHOTS™ platform.

In this way, an admin user may have previously used the input device 230a (e.g., to send user inputs) to cause the processor 205a to execute machine executable instructions for defining commands, automating snapshot frequency, snapshot record settings (e.g., what metadata should be included in a specific snapshot record), etc. The processor 205a may include a user command component, such as for the user to create and publish contract groups to the SNAPSHOTS™ platform as well as create snapshot configurations via the input device 230a. Accordingly, the input device 230a can be used by operators of computing platforms to automatically capture selected representations of GUIs rendered by computing platforms 120 as experienced by a typical user of those computing platforms 120, such as to capture snapshots representing acceptance by a party of a contractual agreement between the party and a computing platform operator. The snapshot metadata determined or received by the client device 120 may be stored in the memory 220b by the processor 205b.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Furthermore, FIG. 2B illustrates a client device (of one or more client devices) 120 and a server (of one or more servers) 130 of the example computing network 260 for use in the network architecture of FIG. 1, according to some embodiments. Each of the one or more client devices 120 and the one or more servers 130 may access each other and other devices in the network 150. The administrative user computing device 110, snapshot server 130, end user computing device 240, and webserver 250 depicted in FIGS. 1-2 may each include a processor 205a-205d and memory 220a-220d, respectively. Generally, the client devices 110, 120, 240 and the servers 130, 250 comprise computing devices including at least: the memory storing instructions and the processors configured to execute the instructions to perform, at least partially, one or more steps as described in methods disclosed herein. The end user computing device 240 may be a part of a larger end user computing platform that may include one or more peripheral devices useful to the function and operation of the device 240.

User computing devices 110 and 240 may be hardware devices, as described herein for client devices; however, the type of user will be different. An administrative user of computing device 110 may create, setup, and generate the contract group element that is used by the webserver 250 to deliver content to an end user. The administrative user (or admin user) is not the user accepting a clickwrap agreement. The end user reviewing and accepting the clickwrap agreement is an end user (e.g., customer, prospective customer, or visitor) of the end user computing device 240 displaying a graphical user interface (GUI) including the online clickwrap agreement.

The system disclosed herein may accommodate A/B testing of contract groups including an online clickwrap agreement. In one example, the system 260 accommodates A/B testing by adding a new (or modifying an existing) snapshot configuration to include one or more parameters to cause it to direct the snapshot server 130 to associate the end user's GUI and metadata with the second ("B" in A/B) version of the GUI generated by the webserver 250. In other words, when an administrative user computing device 110 causes a contract group element to be generated for later inclusion in a webpage that will be delivered by a webserver 250, the snapshot configuration may include an additional parameter (or sub-parameter linked to) to the target URL parameter of the snapshot configuration. This additional parameter indicates which of version "A" or version "B" is delivered to the end user computing device 240 due to the A/B testing being performed by the webserver 250. As a result, the snapshot record for the target URL stored in a data store of the snapshot server 130 will include an additional identifying parameter/sub-parameter: a version parameter, so that even if both the target URL and snapshot timestamp are the same for two snapshot records, the version parameter (e.g., in its metadata at time the of snapshot capture) will be a differentiator to uniquely identify its corresponding snapshot image.

Stated another way, when the snapshot server 130 creates a virtual machine to capture a snapshot image of the GUI, the snapshot server 130 considers the target URL, navigation instructions, and other parameters in the snapshot configuration. When a version parameter for A/B testing (or any other form of testing) is present in the snapshot configuration, the snapshot server 130 will update its snapshot methodology accordingly. As a result, when an end user later visits the target URL from an end user computing device 240, the corresponding version A, version B, or other version of the GUI last captured as a snapshot record will already be saved in the data store and available for associating with the end user's acceptance of the clickwrap agreement displayed on (or accessible from) the GUI. The acceptance metadata of the GUI on the end user computing device 240 will identify which version of the A/B testing is being delivered. In particular, because the A/B testing may be performed dynamically (e.g., the same type of end user platforms may receive different GUIs showing clickwrap agreements or different contract groups), the features disclosed herein of the snapshot server 130 enable capture of snapshot images and metadata accordingly. In one example, the snapshot configuration may comprise a version identification parameter used for A/B testing of the page, such that two end users visiting the same URL for a page receive different layouts/formatting of the same clickwrap agreement. In some examples, the A/B testing may be achieved by a name-value parameter appended to the URL, in a browser cookie, or other message format in the metadata associated with the GUI delivered by the web server 250 to the end user computing device 240. In other examples, region/language localization and other features may also be included in the snapshot configuration and metadata extracted from the content delivered by the webserver 250 such that different versions delivered from the same target URL (or other non-webpage uniform resource locator) are distinguishable, trackable, and associated with the appropriate snapshot record in a datastore of the snapshot server 130.

Although in some examples, AB testing is described as being performed with a webserver, web browser on an end user computing device, and a webpage containing a contract group element, this disclosure is not so limited; for example, the webserver may be substituted with an application server, such as a mobile application server, that delivers content and a contract group element to an end user's display through a means other than a webpage.

Figure 3:
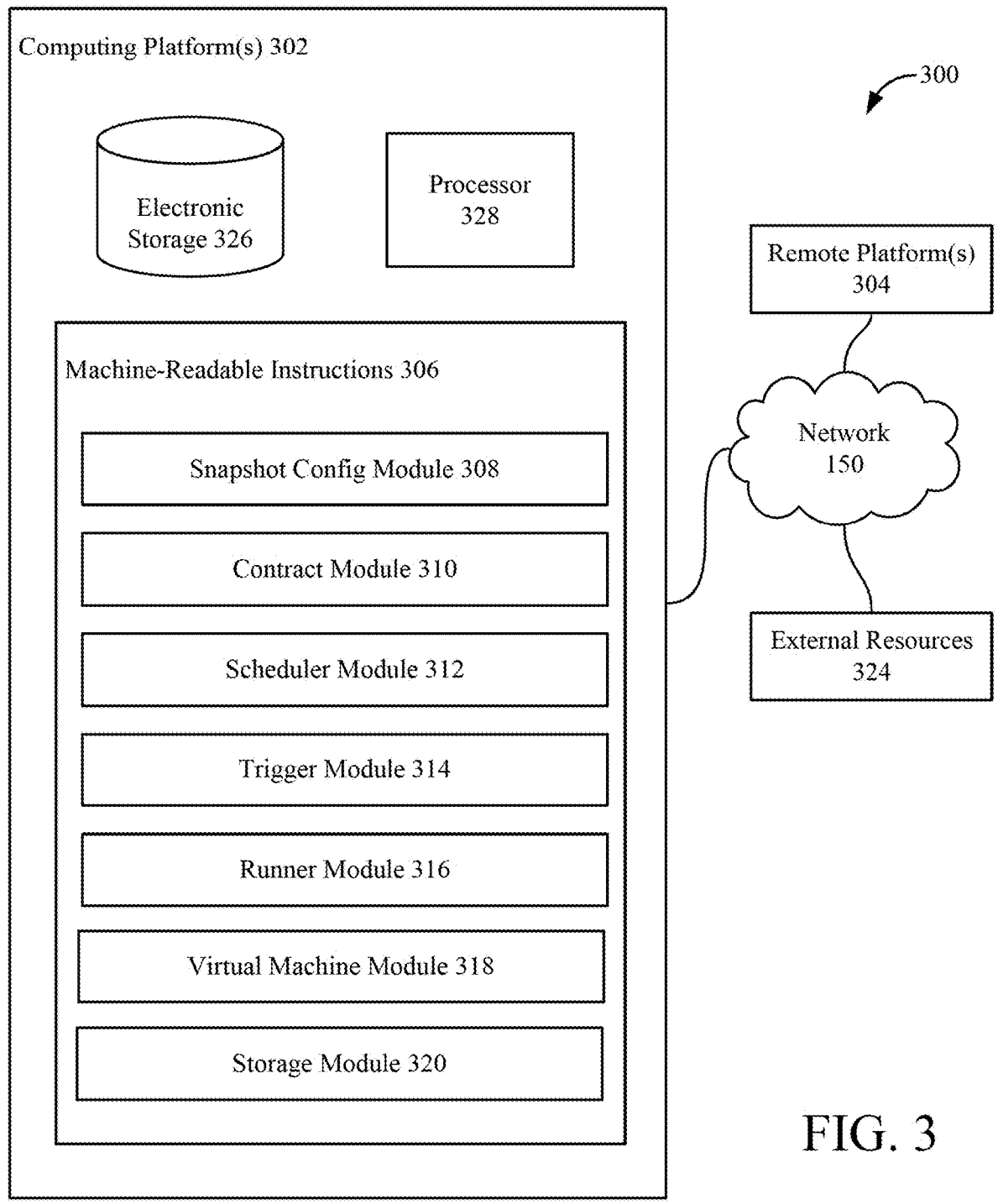
FIG. 3 is a block diagram illustrating an example computer system (e.g., representing both client and server) with which aspects of the subject technology can be implemented.

FIG. 3 is a block diagram illustrating an example computer system 300 (e.g., representing both client and server, one computing device, etc.) with which aspects of the subject technology can be implemented. The system 300 may be configured for outputting snapshots of a graphical user interface via a SNAPSHOTS™ platform, according to certain aspects of the disclosure. In some implementations, the system 300 may include one or more computing platforms 302. The computing platform(s) 302 can correspond to a client component of a content computing platform, which can be similar to or the same as the client(s) 120 of FIGS. 1-2. As an example, the computing platform(s) 302 can comprise processor(s) that may be similar or the same as processor 205b and comprise electronic storage 326 that may include data file 224 and/or databases such as databases 222, 226, 228. The computing platform(s) 302 may function as a server based platform that records snapshots and embeds information such as contract groups in a public location (e.g., an online location or internet/network 150 hosted location). The computing platform(s) 302 may associate the contract groups with snapshot configurations to record events that should be recorded via snapshots, such as contract acceptance events.

The computing platform(s) 302 may be configured to communicate with one or more remote platforms 304 according to a client/server architecture, a peer-to-peer architecture, and/or other architectures via the network 150, in order to obtain snapshot configuration information (e.g., URL for taking snapshots) such as described herein. The remote platform(s) 304 may be configured to communicate with other remote platforms via computing platform(s) 302 and/or according to a client/server architecture, a peer-to-peer architecture, and/or other architectures. The computing platform(s) 302 sends snapshot records including taken snapshots and associated metadata to the remote platform(s) 304, such as in response to information received from the remote platform(s) 304 that is indicative of a snapshot configuration associated with a contract group. A job scheduler of the computing platform(s) 302 may cause the computing platform(s) 302 to periodically capture snapshots by loading any contract groups with snapshots enabled based on contract groups created via the remote platform(s) 304.

The computing platform(s) 302 may be configured by machine-readable instructions 306. The machine-readable instructions 306 may include logic executable by the computing platform(s) 302 to implement one or more instruction modules. The instruction modules may include computer program modules. The instruction modules may include one or more of snapshot configuration (config) module 308, contract module 310, scheduler module 312, trigger module 314, runner module 316, virtual machine module 318, storage module 320, and/or the like.

The snapshot config module 308 may control and manage snapshot capture and data settings of the SNAPSHOTS™ platform implemented by computing platform(s) 302 via instructions from the remote platform(s) 304, for example. The instructions can include a version of an application (e.g., native application) corresponding to an end user (e.g., customer) computing platform, which can be loaded into an emulator via the virtual machine module 318. The loading of the emulator may include, in some examples, an administrative user identifying an application and a location where it can be downloaded for use by the virtual machine module 318. This application version provided by the remote platform(s) 304 can enable execution of commands to navigate to a portion or GUI of the customer computing platform for snapshot capture. In this way, the snapshot config module 308 and virtual machine module 318 may execute native application functions via a virtual machine emulation rather than needing a physical device executing the native application. For example, application functions can include selecting merchandise to purchase via the application, setting user preferences via the application, navigating to screens of the application, and/or the like. For example, the remote platform(s) 304 may provide the application version so that the snapshot config module 308 and virtual machine module 318 can script a flow such as simulation of the computing platform(s) 302 going to an application store, downloading the latest version of the customer computing platform application, and running commands as if the computing platform(s) 302 included an attached physical device executing the native application functions and commands.

The information provided by the remote platform(s) 304 can include information for the computing platform(s) 302 to determine where to take snapshots. For example, the remote platform(s) 304 may send a URL corresponding to a GUI that illustrates terms and conditions of a contract, such as without interaction. Alternatively, the terms and conditions may only be displayed after interaction with the GUI. As an example, the computing platform(s) 302 may determine such as navigation commands to interact with the GUI to display the terms and conditions. In one example, the GUI with the clickwrap agreement may require populating text in a textbox field and triggering a button control press. The navigation commands can be executed based on the virtual machine emulator implemented by the virtual machine module 318. The navigation instructions/commands can be selected via a command builder component of the snapshot config module 308. For example, commands selectable via the commands builder can include a load URL command, a wait for selector command (e.g., wait for a login screen), a type command (e.g., type login credentials when the login screen shows up), a click command (e.g., a user causing a user input such as a mouse click to be received by the customer computing platform), and/or the like.

In general, a configuration created by the snapshot config module 308 can specify how to access GUIs for taking snapshots as well as when and how to take such snapshots. As an example, the commands from the command builder component can be used to navigate through webpages or a native application to access the GUIs that should be subject to snapshot capture. As discussed herein, the commands can specify how to proceed through steps for interacting with the customer computing platform, such as how to step through a native application of the customer computing platform to simulate conducting a commercial interaction, which can include entering a contract for a commercial purpose via stepping through the native application. The snapshot configuration of the snapshot config module 308 may include the computing logic necessary for performing such navigation steps (e.g., via the virtual machine emulation) through the native application or pages of the customer computing platform to identify or access the GUIs that are desired to be subjects of snapshots. To this end, the created snapshot configuration can specify a frequency or cadence of automatic snapshot capture.

The contract module 310 can generate contract groups, which can be associated (e.g., attached or otherwise linked) to various created snapshot configurations. Contract groups can refer to data groups stored on a SNAPSHOTS™ platform, such as stored on the electronic storage 326. Contract groups may include information associated with or relevant to specific contracts or contractual transactions such as terms and conditions. As an example, contract groups can be associated with URLs, such as URLs corresponding to a website of an online merchant. Contract groups can be created and published to a SNAPSHOTS™ platform such as by users of the computing platform(s) 302 and/or the remote platform(s) 304. The published contract groups may be used by the computing platform(s) 302 to take some action to trigger new snapshots at a specified cadence or time interval. After publication, the contract module 310 may be embedded to various contract groups via a javascript library or server-side implementation to record standard contract acceptance events. Such contract acceptance events can correspond to GUIs that are desirable subjects of snapshots, such as to provide evidence of what terms and conditions were agreed to during contract acceptance. As such, when a particular contract group is associated (e.g., attached or otherwise linked) to a particular snapshot configuration, automatic snapshots to be taken by the SNAPSHOTS™ platform may be enabled.

The scheduler module 312 may schedule how often such automatic snapshots should be taken. The schedule module 312 can schedule snapshots at a frequency specified by a cadence parameter of the snapshot parameter. The frequency can be daily, hourly, or some other periodicity, such as automating a snapshot job that runs daily. For a daily frequency, the scheduler module 312 may implement a clock to determine how much time since the most recent snapshot was taken and compare it to a threshold specified by the cadence/frequency to determine whether another snapshot should be taken. When the scheduler module 312 determines that another snapshot should be taken, the navigation via the native application or webpages by the virtual machine emulation can be performed. In other words, the navigation steps necessary to be performed to access the GUI(s) that are used to take snapshots can be triggered by the scheduler module 312. To implement this scheduling, the scheduler module 312 may load any contract groups published to the SNAPSHOTS™ platform and which also contain a valid snapshot configuration.

For such contract groups, the scheduler module 312 may determine when a new snapshot is required, such as via comparison to the threshold indicating that the specified cadence exceeded the threshold or via a manual trigger by the remote platform(s) 304. In such situations, the scheduler module 312 can cause the trigger module 314 to asynchronously trigger a snapshot to be taken. The trigger module 314 may physically trigger a new disk image container or a server (e.g., cloud server) containing installed virtualization software. The new disk image container (or virtualization software) may be used to initiate the virtual machine emulation of the virtual machine module 318 to perform navigation steps to access the GUIs subject to the new snapshot. As used herein, triggering can refer to triggering initiation of the snapshot, such as on the native application used to access the GUIs. The trigger module 314 may perform the trigger via the virtual machine emulation or a physical device if possible. The virtual machine emulation advantageously may enable the trigger module 314 to effectively execute or simulate execution of instructions unique to the native application or device that renders the GUIs so as to access the GUIs for capturing snapshots even without a physical device configured to execute the native application.

The runner module 316 can provide a platform for the native application or pages to run on. For example, the runner module 316 may correspond to a type of browser or a type of smartphone operating system. The runner module 316 may include the scripts of the app necessary to function as a compute service that executes codes for invoking the virtual machine emulation. As an example, the runner module 316 can provide an API or test automation framework to control the type of browser or the type of smartphone operating system to execute navigation or other commands, such as to access target GUIs rendered via the native application or webpages. The runner module 316 can read the snapshot configuration of those snapshot configurations associated with contract groups. Based on reading the snapshot configurations, the runner module 316 may cause snapshot(s) of selected GUI(s) to be taken and uploaded to a location such as remote cloud storage. In addition, metadata associated with the taken snapshot(s) can be included in a snapshot record stored at the remote cloud storage via a webbook. In general, the platform provided by the runner module 316 can be used by a user or a compute service to log into the native application for taking and uploading snapshots of the snapshot record.

The virtual machine module 318 may be used to provide a virtual operating system (e.g., a type of smartphone operating system) for enabling snapshot automation. Advantageously, the virtual operating system may enable navigation, access, and executing other native application commands without requiring the use of a physical device executing the type of smartphone operating system. In particular, the virtual operating system of the virtual machine module 318 could be used to download applications from an application store and step through such applications. The virtual machine module 318 may be used to virtualize applications provided to the computing platform(s) 302 by the remote platform(s) 304. For example, the type of smartphone operating system can be an Android™ operating system. As an example, the virtual machine module 318 may receive a pre-release or customer signed version of the application to load into the emulator of the virtual machine module 318.

The customer specific version of the application can be part of external resources that are provided to the computing platform(s) 302. To provide the virtual operating system, the virtual machine module 318 may physically trigger a new disk image container or server that has virtualization software installed on it. The virtualization software can include scripts that model the flow of downloading the latest version of the application from the application store to execute commands as if a physical device were executing the application. For example, the virtual machine module 318 can use the scripts via the disk image to navigate to the application store, download the application, and run through a command such as opening the application and waiting for or navigating to the correct page to take a snapshot. In general, the virtual machine module 318 can emulate physical devices such as a mobile smartphone device.

The storage module 320 can store snapshot record(s) including corresponding captured snapshot(s) and metadata. As such, the storage module 320 may provide a physical record of an online interaction. For example, the storage module 320 may provide an immutable PDF (or any other appropriate format that ensures immutability) including temporal metadata of when a contract party agreed to terms and conditions of a contractual transaction conducted online.

To this end, the storage module 320 can access contract groups comprising contract data of contracts provided via a customer computing platform. Based on the snapshot functionality described herein, the storage module 320 may store the most recent version of contracts that a contractual party accessing the customer computing platform has accepted or agreed to. The storage module 320 may also store acceptance events comprising screenshots (e.g., snapshot images) of GUI(s) illustrating that the contract party has accepted/entered into a contractual relationship based on the terms and conditions of the most recent contract version of the customer platform. The screenshots may be in .PNG (or other appropriate image format). The storage module 320 may comprise or be in communication with the electronic storage 326 to store snapshot or contract data accessible by the remote platform(s) 304.

In some implementations, the computing platform(s) 302, the remote platform(s) 304, and/or the external resources 324 may be operatively linked via one or more electronic communication links. For example, such electronic communication links may be established, at least in part, via the network 150 such as the Internet and/or other networks. It will be appreciated that this is not intended to be limiting, and that the scope of this disclosure includes implementations in which the computing platform(s) 302, the remote platform(s) 304, and/or the external resources 324 may be operatively linked via some other communication media.

A given computing platform 302 (or given remote platform 304) may include one or more processors 328 configured to execute computer program modules. The computer program modules may be configured to enable users associated with the given computing platform 302 to interface with system 300 and/or external resources 324, and/or provide other functionality attributed herein to computing platform(s) 302. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms. The external resources 324 may include sources of information outside of the system 300, external entities participating with the system 300, and/or other resources. In some implementations, some or all of the functionality attributed herein to the external resources 324 may be provided by resources included in system 300.

The computing platform(s) 302 may include the electronic storage 326, the processor(s) 328, and/or other components. The computing platform(s) 302 may include communication lines, or ports to enable the exchange of information with a network and/or other computing platforms. Illustration of the computing platform(s) 302 in FIG. 3 is not intended to be limiting. The computing platform(s) 302 may include a plurality of hardware, software, and/or firmware components operating together to provide the functionality attributed herein to the computing platform(s) 302. For example, the computing platform(s) 302 may be implemented by a cloud of computing platforms operating together as the computing platform(s) 302.

The electronic storage 326 may comprise non-transitory storage media that electronically stores information. The electronic storage media of the electronic storage 326 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). The electronic storage 326 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 326 may include one or more virtual storage resources (e.g., cloud storage, a virtual private network, and/or other virtual storage resources). The electronic storage 326 may store software algorithms, information determined by the processor(s) 328, information received from computing platform(s) 302, information received from the remote platform(s) 304, and/or other information that enables the computing platform(s) 302 to function as described herein.

The processor(s) 328 may be configured to provide information processing capabilities in the computing platform(s) 302. As such, the processor(s) 328 may include one or more of a digital processor, an analog processor, a digital circuit designed to process information, an analog circuit designed to process information, a state machine, and/or other mechanisms for electronically processing information. Although the processor(s) 328 is shown in FIG. 3 as a single entity, this is for illustrative purposes only. In some implementations, the processor(s) 328 may include a plurality of processing units. These processing units may be physically located within the same device, or the processor(s) 328 may represent processing functionality of a plurality of devices operating in coordination. Processor(s) 328 may be configured to execute modules 308, 310, 312, 314, 316, 318, 320 and/or other modules. Processor(s) 328 may be configured to execute modules 308, 310, 312, 314, 316, 318, 320, and/or other modules by software; hardware; firmware; some combination of software, hardware, and/or firmware; and/or other mechanisms for configuring processing capabilities on the processor(s) 328. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although the modules 308, 310, 312, 314, 316, 318, and/or 320 are illustrated in FIG. 3 as being implemented within a single processing unit, in implementations in which the processor(s) 328 includes multiple processing units, one or more of the modules 308, 310, 312, 314, 316, 318, and/or 320 may be implemented remotely from the other modules. The description of the functionality provided by the different modules 308, 310, 312, 314, 316, 318, and/or 320, described herein is for illustrative purposes, and is not intended to be limiting, as any of the modules 308, 310, 312, 314, 316, 318, and/or 320 may provide more or less functionality than is described. For example, one or more of the modules 308, 310, 312, 314, 316, 318, and/or 320 may be eliminated, and some or all of its functionality may be provided by other ones of the modules 308, 310, 312, 314, 316, 318, and/or 320. As another example, the processor(s) 328 may be configured to execute one or more additional modules that may perform some or all of the functionality attributed below to one of the modules 308, 310, 312, 314, 316, 318, and/or 320.

Figure 4A:
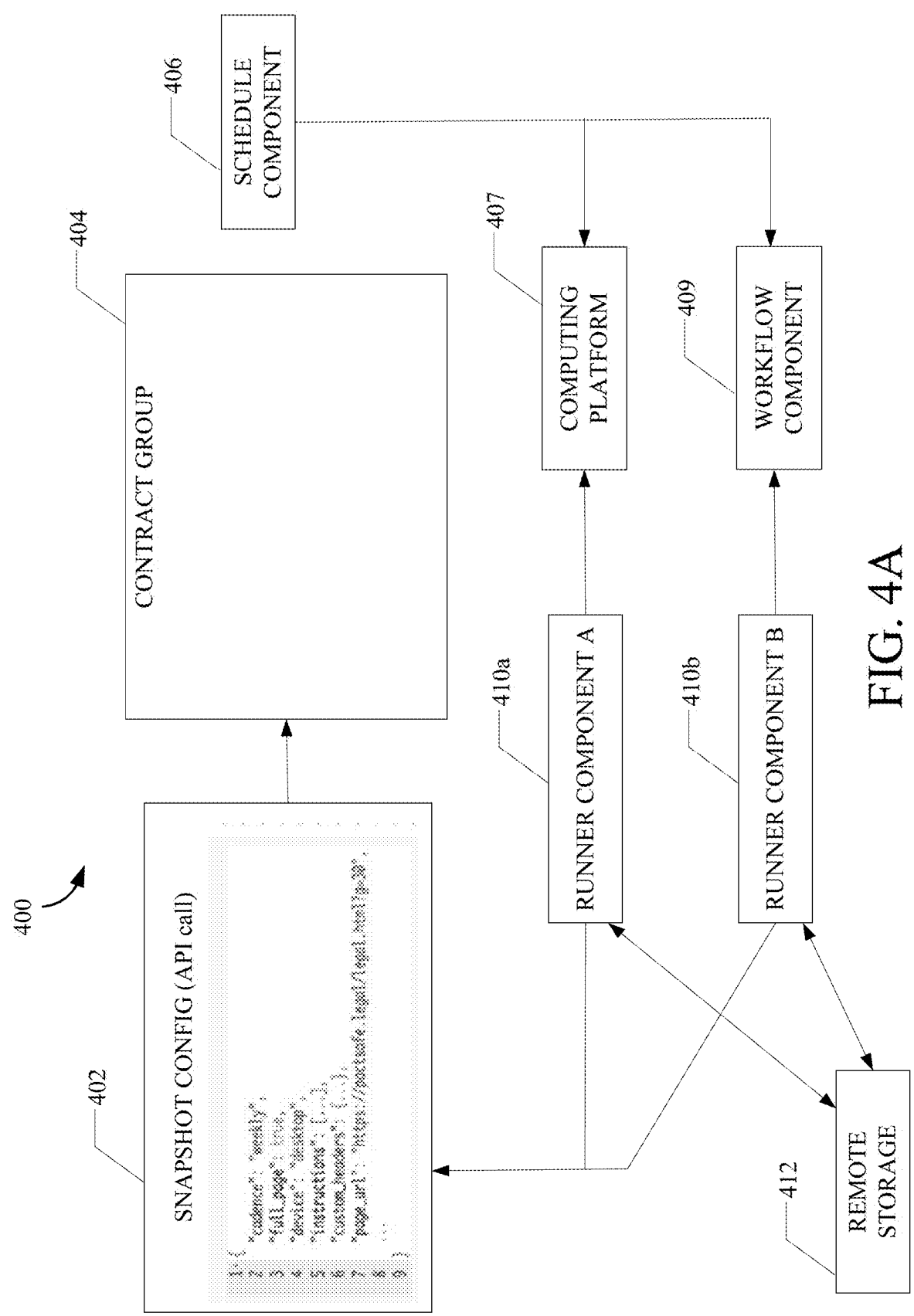
FIG. 4A, FIG. 4B, FIG. 4C, and FIG. 4D (collectively "FIG. 4") are example block diagrams for automatically triggering, outputting, and associating snapshots of a graphical user interface with clickwrap agreements, according to certain aspects of the present disclosure.

FIG. 4A, FIG. 4B, FIG. 4C, and FIG. 4D (collectively "FIG. 4") are example block diagrams for automatically triggering, outputting, and associating snapshot records of a graphical user interface with clickwrap agreements, according to certain aspects of the present disclosure. Referring to FIG. 4A, a snapshot config 402 may be created, such as based on a user causing an API call to be made to a snapshot config group for a JSON payload (e.g., by posting a JSON payload to an API endpoint) or based on a self-service configuration. In one example, the snapshot config 402 can be generated based on information indicative of an external location (external to a SNAPSHOTS™ platform as described herein) such as a website or mobile application. The snapshot config 402 can be created with information of a web browser or mobile browser (e.g., to access webpages) or a native mobile application. For example, for a browser, the snapshot config may be created with information identifying a physical device, a page URL, a cadence, headers, and instructions. The information may include what type of physical device is used to render the browser, such as a desktop computer, a mobile device executing an Apple iPhone® operating system (iOS®), or a mobile device executing an Android™ operating system, and/or the like. The page URL can indicate the location of a contract group, which can contain contractual information (e.g., terms and conditions) of a customer computing platform (e.g., online merchant platform) accessed via the browser.

The cadence may specify how often a snapshot is taken such as on a daily, weekly, monthly, or other frequency. The headers can be custom headers created by the customer computing platform. Such headers may be passed to a SNAPSHOTS™ platform with network calls invoked by a runner to capture snapshots. For example, the custom headers can be security tokens, authorization tokens, and/or the like corresponding to the customer computing platform. Instructions of the snapshot config can also be passed to the runner for navigation through the browser for setting up capture of snapshots. For example, the instructions can instruct the SNAPSHOTS™ platform to perform more complex navigation flow instructions such as populating credentials into a text box and triggering a continue text box/button. Such complex navigation steps can be performed via a virtual machine that emulates the type of physical device rendering pages of the customer computing platform. For a native mobile application, for example, the snapshot config may be created with information identifying a physical device, a native parameter, a cadence, headers, mobile application name, and/or instructions.

The physical device can be a computing device such as a smartphone executing an Apple iPhone® operating system (iOS®), or a mobile device executing an Android™ operating system, and/or the like. As such, the snapshot config 402 can specify various parameters and information useful for automating snapshot capture via the SNAPSHOTS™ platform. The snapshot config 402 can be associated (e.g., attached or otherwise linked) to one or more contract groups 404 of a plurality of contract groups, such as via a user interface. In this way, a specific instance of snapshot config 402 (e.g., for a website or native application) may be logically associated with the corresponding contract terms and conditions for interactions conducted via the website or native application. Associating a particular snapshot config 402 to a particular contract group 404 enables (e.g., makes possible) snapshots for the configuration group pair. The enabled snapshots can be representative screenshots for all users accessing the GUI(s) or navigation flow corresponding to the end user (e.g., customer) computing platform. The snapshot config 402 can be created and associated (e.g., attached or otherwise linked) to a contract group 404. The contract group 404 can be embedded via a client-side implementation (e.g., Javascript snippet) or server-sided implementation to record standard contract acceptance events for the associated contract information of the contract group 404. As an example, the contract group 404 may comprise a record of metadata indicative of the terms and conditions of a contract agreement formed via a public website and available for an end user to accept.

The record can also include data from the end user (e.g., customer) computing platform for the contract group 404 so that the most recent version of contracts/contract terms from the customer computing platform are included. The block diagram 400 may also include a schedule component 406 for determining which and when snapshots should be taken. For example, the schedule component 406 can be a CRON worker service running on a periodic interval. As an example, when a threshold of the periodic interval is exceeded, the schedule component 406 loads any snapshot configs 402 that are published and contain or are associated (e.g., attached or otherwise linked) to a contract group 404 associated with an active clickwrap agreement. For example, the snapshot configuration 402 may have a reference (e.g., contract group element) to one or more contract groups 404 and/or a time parameter of a contract acceptance event (e.g., when a contract from the contract groups 404 was last previously agreed to be based on a snapshot of a particular display screen). The periodic interval can be hourly, for example. That is, every hour, the schedule component 406 can load back all published snapshot configs 402 with an hourly cadence. This loading of snapshot configs 402 (which may or may not be associated with contract groups 402) can be used by the schedule component 406 to determine whether a new snapshot is required. For example, the new snapshot can be required when a threshold cadence/frequency specified by the associated snapshot config 402 is exceeded or the snapshot config 402 indicates that a new snapshot was manually triggered via API. The loading may optionally occur when the snapshot config 402 is associated (e.g., attached or otherwise linked) to the contract group element.

The schedule component 406 may check the specified cadence saved to a specific snapshot config 402 to load in the timestamp of the latest snapshot image taken for the corresponding contract group 404. The timestamp may be included in snapshot record output for the associated configuration group pair. As an example, if the latest snapshot image was taken at 11 AM yesterday, and it is currently noon, snapshot configs 402 having cadence parameters set to "daily" would trigger capture of a snapshot. If a prior attempt fails, the schedule component 406 advantageously may retry capture of snapshots hourly to address the failed snapshot. In these situations, the schedule component 406 may asynchronously trigger a snapshot to be taken, such as by passing the snapshot config 402 to a processor such as the computing platform 407 or workflow component 409. That is, the schedule component 406 may serialize and asynchronously send off the snapshot configs 402 needing new snapshots to be processed by a worker. The computing platform 407 can be an event driven computing service such as AWS Lambda, available from Amazon Web Services of Seattle, Wash. The workflow component 409 can be a software workflow automation component.

The computing platform 407 and the workflow component 409 may be used to support snapshot automation for GUIs of webpages, native applications and/or the like. The computing platform 407 may handle serialized snapshot configs 402 via function invocation, such as via parallel execution. Invocation may cause initiation of a serverless runner type A 410a, such as a headless browser or comparable technology, which can be used for web and mobile browsers. Similarly, any library providing a high-level API to control a web browser in the form of a command runner built on top of the non-graphical web browser may be comparable technology. Invocation may involve translating the serialized snapshot configs 402 into headless browser commands prior to invoking a final screenshot/snapshot instruction which causes an image to be captured. Invocation may also cause initiation of a runner type B 410b, which can be used for native mobile applications and test automation for native, hybrid, mobile web and desktop apps as well as simulators and virtual machine emulators. Native application invocation may involve serializing the snapshot configs 402 and passing the serialized snapshot configs 402 to an API endpoint of the workflow component 409. The API endpoint can then trigger, synchronously or asynchronously, the workflow component 409 that can run on an agent installed on a non-cloud based computing device to enable direct access to physical devices such as smartphones running different types of operating systems.

For example, various software workflow automation components of the workflow component 409 can queue until a prior action being run has succeeded. Upon the prior action being successful, a subsequent software workflow automation component can be triggered so that the corresponding snapshot config(s) 402 is passed from a node runner process of the workflow component 409 to the runner type B 410b. A native application snapshot automation tool is useful as a command runner built to perform user interface actions on top of native mobile devices may be used. To this end, snapshot configs 402 are translated into commands for a test automation framework before a save screenshot/snapshot instruction is invoked to capture an image. The runner type B 410b may execute virtualization software or trigger a new disk image to initiate a virtual machine. As an example, an operator of the customer computing platform may provide a native application package (including package name) so that the virtual machine can emulate a physical device executing the native application. In this way, the virtual machine can be used by the runner type B 410b to perform or simulate commands associated with the native application, such as to perform a complex navigation flow including downloading the native application from an application store and executing commands received by the operator to navigate to a screen (e.g., login page, anchor page, etc.) and take a snapshot of corresponding GUI(s).

The runner type A 410a may also implement virtual machine emulation. For example, the runner type A 410a may create a virtual machine to perform and/or simulate navigation through a web application of the customer computing platform. Customer provided builds, such as from the remote platform(s) 304, can be used to facilitate virtualized emulation. The runner type A 410a and runner type B 410b may read snapshot configs 402, depending on whether the snapshot configs 402 correspond to browsers or native applications. If custom headers are available, the runner type A 410a and runner type B 410b may read snapshot configs 402 by setting an internal configuration to use custom headers for all network requests. Reading the snapshot configs 402 can cause the runner type A 410a to navigate to one or more associated page URLs and can cause the runner type B 410b to open the associated native mobile application, respectively. Reading the snapshot configs 402 also enables the runner type A 410a and the runner type B 410b to execute any instructions specified by the snapshot configs 402, such as complex navigation instructions.

The runner type A 410a and the runner type B 410b are triggered to take snapshots according to the information contained within the snapshot configs 402 and associated contract groups 404. The runner type A 410a and the runner type B also can capture metadata of the snapshot, such as for compiling into a snapshot record. The metadata can include a snapshot timestamp (e.g., when was the snapshot taken), user agent information, screen viewport, webpage URL, screen resolution, native mobile application name, or native mobile application version, contract information (e.g., acceptance/agreement information, terms and conditions, party information, etc.), platform information, and/or the like. As an example, the runner type A 410a can capture user agent information, time stamp, screen viewport information, and page URL of a browser(s) of the customer computing platform. As an example, the runner type B 410b can capture physical device information (e.g., smartphone operating system information), time stamp, screen resolution (e.g., of the physical device), and native mobile application name and version of the customer computing platform.

After invocation, the captured image/snapshot may be uploaded to the remote storage 412 at a path specified by the schedule component 406 and/or computing platform 407 or workflow component 409. For example, the remote storage 412 may be cloud based storage. The metadata of the successfully captured snapshot can be passed back to the computing platform 407 or workflow component 409 API, such as via a webhook. This metadata can include an uploaded snapshot location in the remote storage 412 and other captured metadata being sent to the computing platform 407 or workflow component 409 API. The functionality of the schedule component 406, the computing platform 407, the workflow component 409, the runner component A 410a, and the runner component B 410b may be part of one or more mobile or web software development kits (SDKs), respectively. The SDKs can be embedded in various locations of a SNAPSHOTS™ platform.

After successful capture of a snapshot, the webhook that handles the resulting snapshot may be loaded in the corresponding contract group 404 so that it can be updated. For example, the webhook can update the corresponding contract group 404 with the image location of the resulting snapshot, the capture time (e.g., timestamp), and a reference (e.g., reference pointer) to an internal snapshot object (e.g., a snapshot record) that contains associated capture metadata. The updated information can be or form part of a resulting snapshot record. The information updated by the webhook can also be part of the updated corresponding snapshot API call 402. In particular, when new activity occurs in the contract group, such as an update to a version of a contract or an update to terms and conditions, the new activity can be associated with a last successful (e.g., most recently) captured snapshot. In this way, the snapshot record can constitute a record of contract acceptance that attributes one or more representative snapshot images with captured contract acceptance data. The captured contract acceptance data can be based on an acceptance API that implements a mechanism to gather data indicative of updated contract parameters and what terms and conditions are agreed to when a contract is accepted.

Figure 4B:
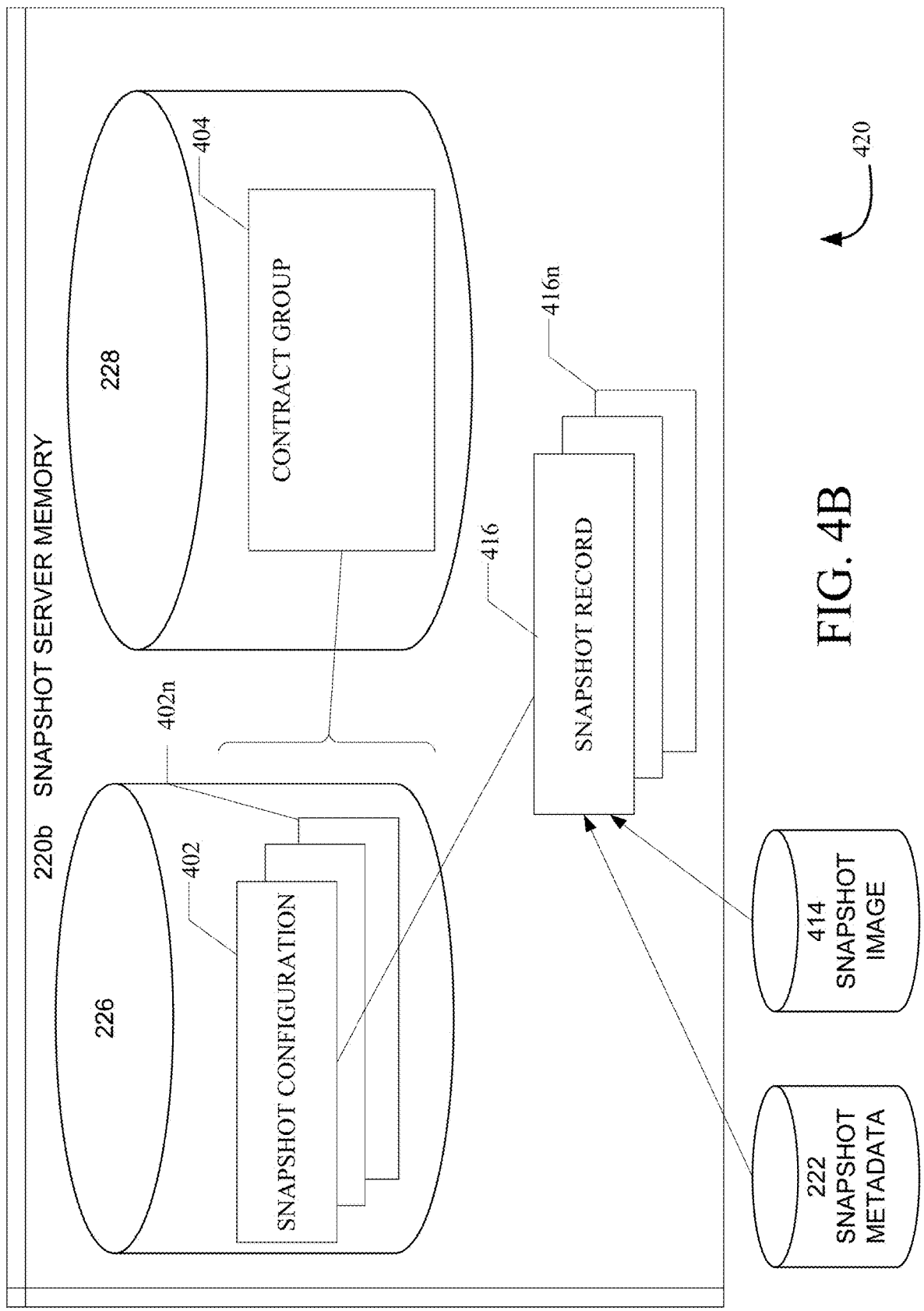

FIG. 4B is an illustrative block diagram 420 showing relationships of output snapshot records (416 to 416n) of a GUI based on a snapshot configuration, according to certain aspects of the present disclosure. A single contract group 404 may be associated with a plurality of snapshot configurations (402 to 402n), such that each 402 of the plurality 402n of snapshot configurations corresponds to different combinations of the snapshot metadata. Although the contract group 404 contains the same contractual language and allows acceptance in the same way, it may itself render or otherwise be presented differently to visitors (i.e., end users) on a mobile computing device than to those visitors on a laptop device. The type of end user computing platform (e.g., mobile, laptop, or other device) and its operating system (e.g., Apple iOS, Android O/S, or other operating system) may serve as parameters of the snapshot configuration 402. As a result, in some examples, the contract group 404 may be associated with multiple different snapshot configurations (402 to 402*n*) such as: (1) mobile and Apple iOS; (2) mobile and Android O/S; (3) laptop and Apple iOS; and (4) laptop and Android O/S. One reason for associating different snapshot configurations to the same contract group is because the graphical user interface (GUI) rendering on some type of computing platforms and/or operating systems may look visually different for the same content. For example, an HTML webpage with an embedded contract group element, which corresponds to the aforementioned clickwrap agreement, may include a checkbox (or button) control element that might render differently on a GUI of a mobile computing device than on the GUI of a laptop device. Similarly, the same HTML webpage may render differently on different operating systems, and even versions/builds of the same operating system. The snapshot configuration 402 may include parameters other than type of end user computing platform and operating system.

A snapshot server 130 may periodically check if new snapshot records are desired by checking whether a threshold cadence/frequency specified by the associated snapshot configuration 402 has been exceeded (e.g., when a snapshot configuration identifies a daily cadence, but the last-captured snapshot record 416 corresponding to the snapshot configuration 402 is more than a week ago). If so, then the snapshot server 130 may trigger, via an API call, generation of a snapshot record accordingly. If the periodic interval is hourly, for example, then every hour, the snapshot server 130 may load back all published snapshot configurations 402 with an hourly cadence. In an alternate example, the snapshot configuration 402 may store the timestamp of the last snapshot image captured using the set of parameters (e.g., device, instructions, page URL, clickwrap agreement, and others) defined in the snapshot configuration 402. In other examples, the last snapshot image captured value might not be stored in the snapshot configuration 402 itself, and instead it may be retrieved in real-time by searching a repository of snapshot records to identify the last captured snapshot record associated with the particular snapshot configuration 402.

In an alternate example, FIG. 4B may be part of a framework that further extends the functionality described in FIG. 2B. Rather than capturing a snapshot through a virtual client computing device 120 emulating an end user's computing device, in this alternate example, the end user computing device 240 may be equipped with the capabilities to itself capture an image of the GUI displayed on a screen of the end user computing device 240. In such an example, when the device 240 is used to accept a clickwrap agreement on an application page served by an application server (not shown in FIG. 2B) to the display of device 240, then software executing on the processor 205*c* of the device 240 determines whether a representative snapshot is already saved in this cadence for the snapshot configuration key (or contract group element). The device 240 may make this determination by sending a request to the snapshot server 130 and await a reply. The query request may include the snapshot configuration key and other metadata, such as a timestamp, type of platform, and/or other information, to assist the snapshot server 130 in performing a lookup of the data store storing snapshot records. In one example, the method may include calculating a time difference between the timestamp of the acceptance metadata and a timestamp of the snapshot metadata of the last-captured snapshot record 416*n* associated with the identified snapshot configuration 402; and then determining that the calculated time difference is greater than the snapshot frequency and emulating 120 the end user computing platform to initiate capture of a new snapshot record. If a representative snapshot record is already saved in the data store within the set cadence, then the device 240 may conclude the query. However, if the determination indicates a need for a snapshot, then software modules in the memory 220*c* of the end user computing device 240 may be executed by the processor 205*c* to capture an image of the target GUI. The target GUI may be the one or more locations identified in the associated snapshot configuration for the particular snapshot configuration key. As described in detail herein, the image capture may be performed using one or more technologies including a headless browser or other technology that allows for instruction parameters, as described herein, to be executed on the application page. Along with the graphic image file, the snapshot includes the metadata of the end user computing device 240 at the time of the capture.

Continuing with the preceding example, in another example, before a determination is even made whether or not a snapshot is needed, the end user computing device 240 may preemptively capture an image of the desired GUIs and associated metadata. Then after-the-fact, if the snapshot server 130 returns a determination accordingly, the software module on the device 240 can simply discard the captured image and metadata. However, if the determination indicates that a snapshot is desired in the current cadence, then the preemptively captured GUI image(s) and associated metadata are transmitted/uploaded to the snapshot server 130 for storage in the data store. Alternatively, in another example, the determination about whether or not a snapshot is needed is performed before the end user of the device 240 is even able to accept the clickwrap agreement on the application page. As such, the request may be sent to the snapshot server 130 and a determination made before the end user's ability to accept is enabled/activated/permitted (e.g., a GUI button may be grayed out as unclickable until after the determination has been made, and only then made clickable). Therefore, in that scenario, the device 240 can be prepared to execute the necessary software modules to capture the GUI image if/when the end user engages in activity leading up to and accepting the clickwrap agreement. Like in the preceding example, metadata is also captured and sent to the snapshot server 130 for the storing in the snapshot record including the captured GUI image. The resulting snapshot record may be stored alongside other snapshot records in the data store as a representative snapshot record for the remainder time of the cadence. One benefit of this approach is that it is readily extensible to non-representative snapshots, as it would be trivial to always capture and associate that image back to a particular agreed event and/or user.

In another alternative embodiment, rather than associating a previously-saved representative snapshot record for a particular end user's acceptance of a clickwrap agreement, an actual capture of the end user's screen at acceptance may be saved. The actual captured image and associated metadata may be saved in the data store as usual snapshot records, but with the user's contract acceptance event record being linked (as in FIG. 4C) directly to the actual (not merely representative) snapshot record of the end user. Like with the other examples involving FIG. 4, a unique identifier (e.g., snapshot configuration key) may be identified and used to associate the actual snapshot image with the appropriate clickwrap agreement, contract group, and snapshot configuration. Therefore, for those end user computing devices 240 that are equipped with the software modules and capabilities to capture images and metadata, the device 240 itself may contribute towards populating the snapshot records data store. Meanwhile, for those end user devices incapable of capturing an image of their GUI, a representative snapshot record is associated with the contract acceptance event, as described herein. For example, assume the end user computing device comprises a visual display in a car or autonomous vehicle, and the car/vehicle is not equipped to itself capture and transmit the image and/or metadata required for a snapshot record. In such an example, the end user (e.g., driver) may agree to certain liability waivers and other clickwrap agreements on a touchscreen dashboard of the vehicle before engaging in autonomous or other operation of the vehicle. As described in the numerous examples herein, the driver's acceptance of the agreement is linked through a key or unique identifier to a representative snapshot record previously captured and saved through an emulator. In yet another similarly situated example, the user of a smart television (TV) may agree to a clickwrap agreement related to privacy and other terms of use. However, TV viewers in different geographic locales may be subject to different privacy regulations, thus the TV viewer's acceptance may be linked through a key or unique identifier to a representative snapshot record previously captured and saved through an emulator. The examples of end user computing devices 240 is not limited to laptops, smartphones, cars, and smart TVs, and this disclosure contemplates other comparably situated devices with a visual display, such as streaming platforms (e.g., Roku, Amazon Fire, Apple TV), Microsoft Xbox, and other electronic networked platforms. Moreover, the emulator described herein may emulate such devices as desired through use of SDKs, APIs, and other tools.

Figure 4C:
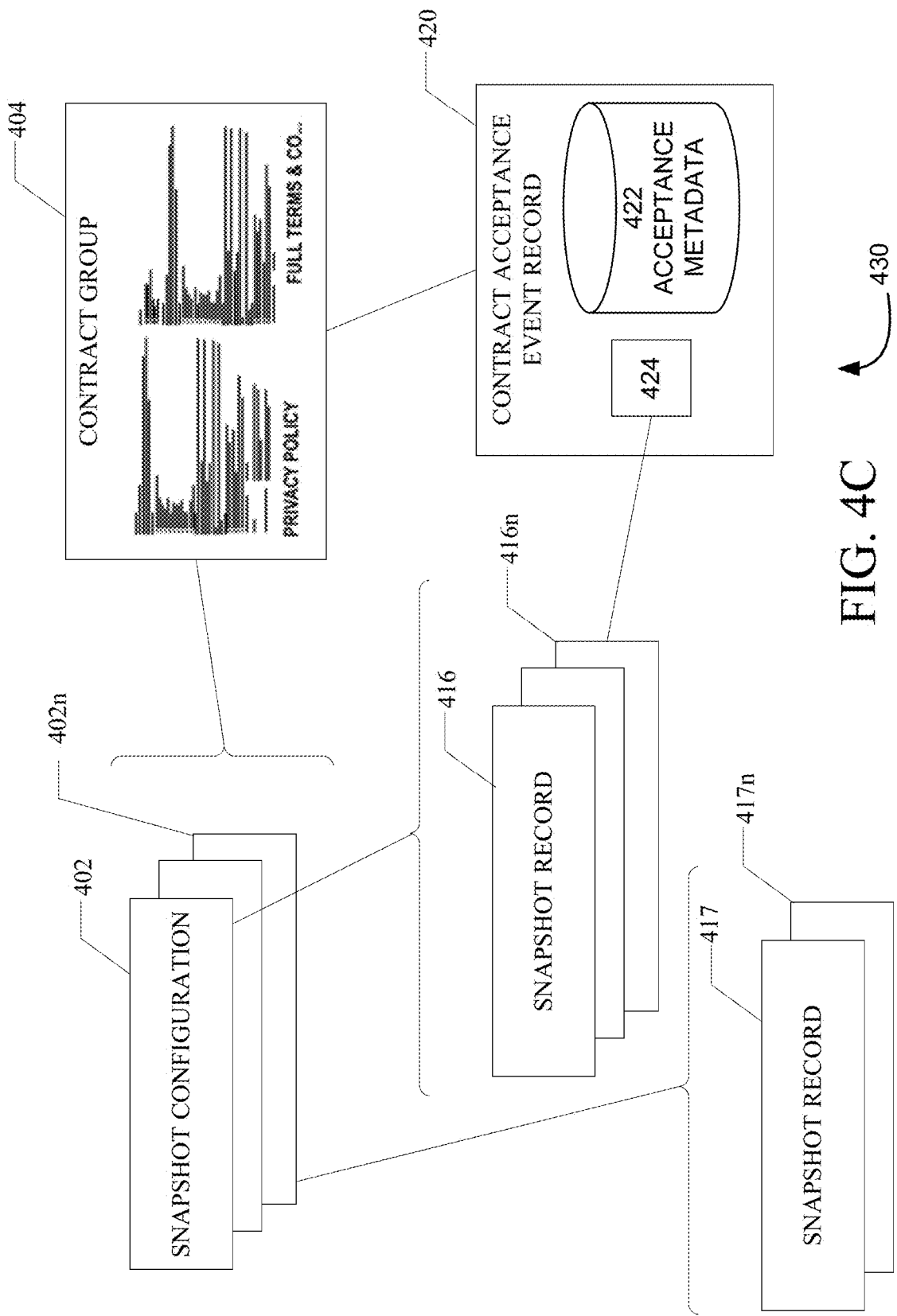

Referring to FIG. 4C, in one illustrative block diagram 430, a contract group 404 may correspond to a clickwrap agreement that appears on a particular adult beverage webpage requiring visitors to the web site to verify their age without requesting any other personally identifiable information (such as name, address, email, and so on) from the visitor. In this example, the particular webpage might have two contracts (e.g., a privacy policy agreement and a full terms and conditions) associated with the contract group 404 because the webpage includes a GUI with clickwrap agreement notices similar to those in image 606. When the acceptance event occurs, the snapshot server 130 may identify which contract group corresponds to the clickwrap agreement that is the subject of the visitor's acceptance. The webpage may be in HTML, format and embed a contract group element corresponding to the aforementioned clickwrap agreement.

The contract group element may comprise a snapshot configuration key that the snapshot server 130 may use to identify the particular snapshot configuration associated with the clickwrap agreement that the visitor (e.g., end user) accepted. The record 420 of the end user's acceptance may be created by a Javascript library and contain a reference to the contract group and a snapshot configuration. The contract group element and the snapshot configuration key are sent with the end user's acceptance of the clickwrap agreement from the web server to the snapshot server 130. As a result, the snapshot server 130 identifies the specific contract group 404 based on the contract group element (e.g., a unique identifier/name in the snapshot configuration 402 that is associated with the contract group 404 corresponding to the contract group element). Once the acceptance event with the snapshot configuration key is received by the snapshot server 130, the processor 205b associates the acceptance event 420 of that clickwrap agreement along with the end user (e.g., signer) to the snapshot configuration 402. Because the acceptance metadata 422 of the contract acceptance event record 420 matches that attributed to the particular snapshot configuration 402 for the provided snapshot configuration key, the snapshot server 130 may reliably proceed to filter the potentially large data repository of snapshot records (416 to 416n, 417 to 417n) to locate a representative snapshot record for the end user's acceptance event. In such an example, no auto-detection is necessary, because an administrative user has created the contract groups 404 and associated them with snapshot configurations (402 to 402n) that use a snapshot configuration key or comparable unique identifier for use in the contract group element that is then provided on the webpage (e.g., the webpage corresponding to image 606) to identify an end user's acceptance event.

In an alternate example, the snapshot server 130 may identify a snapshot configuration corresponding to the visitor's acceptance by similarly matching a unique identifier of a snapshot config that corresponds to (i) the type of the end user computing platform, and (ii) the operating system of the end user computing platform, in the acceptance metadata of the acceptance event against the data store 226 storing snapshot configurations (402 to 402n). The identified snapshot configuration 402 may have one or more snapshot records (416 to 416n) associated with it. Assuming the acceptance metadata 422 indicates a mobile type of end user computing platform and an Apple iOS operating system, then the snapshot server 130 associates the unique identifier of the snapshot config 402 and associated snapshot record 416 that matches these parameters. Other examples of metadata 222 in the snapshot record include but are not limited to: snapshot timestamp, user agent information, screen viewport, universal resource locator (URL) of the page, screen resolution, native application name, native application version, or combination thereof.

Next, the snapshot server updates the contract acceptance event record 420 to insert a link 424 to the last-captured, representative snapshot record 416n. The link 424 may be in the form of unique identifier/key, a hyperlink, or other means for uniquely referencing a data block in memory. The stored snapshot record 416n includes a snapshot image evidencing the visual representation of the GUI at the snapshot time for an environment that matches the snapshot metadata in the snapshot record 416n. The contract acceptance event record 420 may be stored at the snapshot server 130, in a data store communicatively coupled to the snapshot server 130, or may be stored in a data store associated with the webserver 250 or another server (e.g., the server of a third-party service provider.)

Figure 4D:
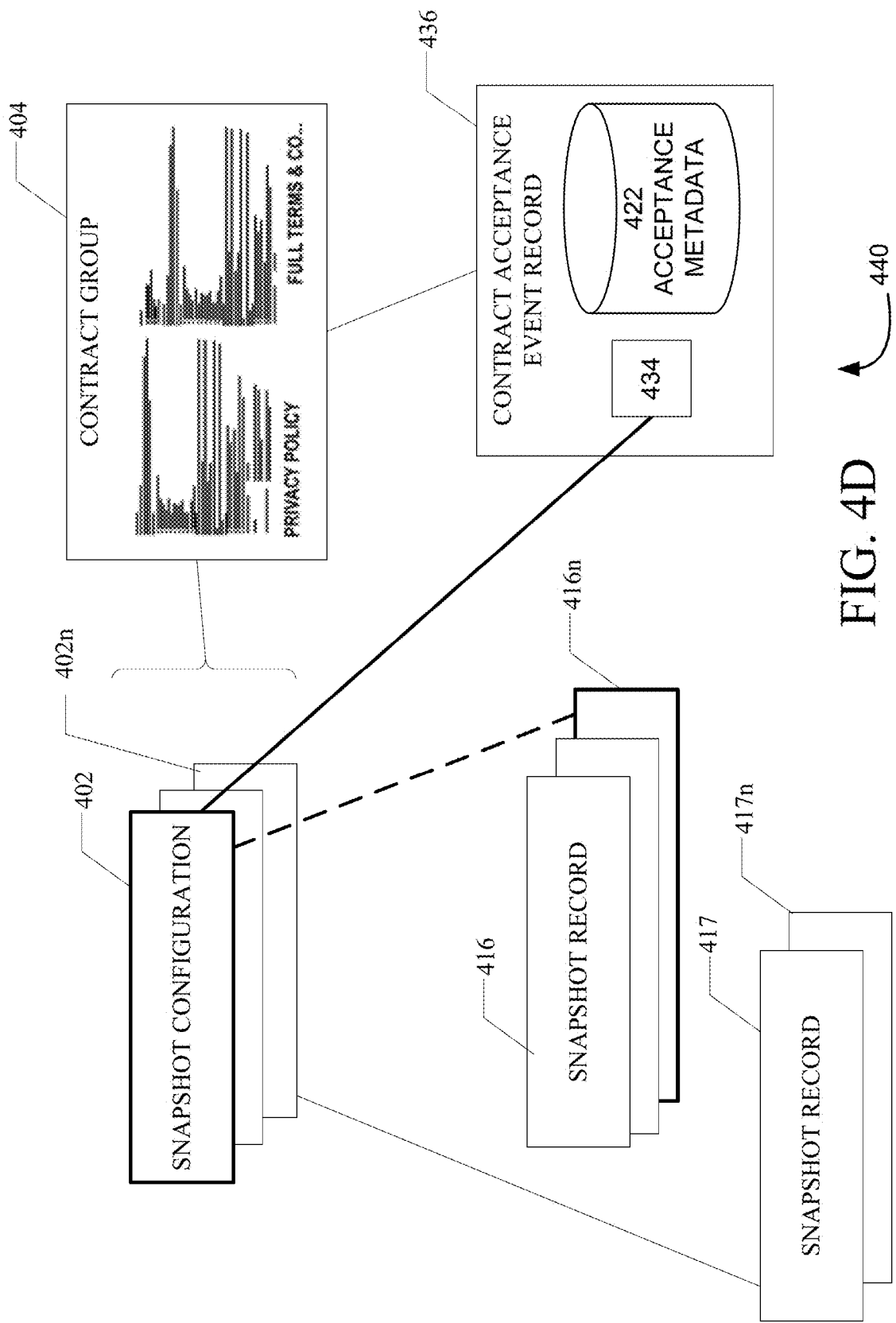

FIG. 4D illustrates an architecture diagram 440 similar to the architecture diagram 430 of FIG. 4C, but in which the link 434 in the contract acceptance event record 436 is to the snapshot configuration 402 instead of directly to the snapshot record 416n. This architecture 440 may be substituted for the other architecture 430 in the numerous examples described in this disclosure, and vice-versa, as applicable. At least one benefit of such an architecture 440 is that any future updates to the historical data store 220b of stored snapshot records 416 to 416*n* are enjoyed by the contract acceptance event record 436. For example, when a link 424 is directly pointed at the last-captured, representative snapshot record 416*n*, the acceptance event record 436 becomes immutable. If the snapshot server 130 later obtains an even more appropriate/representative snapshot record (416 to 416*n*) that is even closer in time before the acceptance event and representative of metadata of the end user computing device 240, because the link 424 in FIG. 4C is fixed/static to the particular snapshot record, the system 430 may be incapable of seamlessly redirecting the link 424 to a new snapshot record. Of course, the snapshot server 130 may include an algorithm to periodically check for such discrepancies and update the link 424, but in a system 200 with a large quantity of snapshot records, such a periodic check is undesirable for being computationally wasteful. In contrast, in the architecture of FIG. 4D, the appropriate snapshot record is located by first identifying the appropriate snapshot configuration 402 using the link 434, and then second, by filtering the snapshot records (416 to 416*n*) associated with that particular snapshot configuration 402. Next, that snapshot record (416 to 416*n*) with a timestamp (e.g., captured_time) closest in time but before the acceptance event record (i.e., timestamp value in the acceptance metadata 422) would be selected as the snapshot record 416*n* to serve as the visually representative snapshot evidencing the GUI displayed on the end user device 240 at the time of clickwrap contract acceptance. Of course, the architecture 440 of FIG. 4D relies upon both a link 434 (e.g., a snapshot configuration key) to the snapshot configuration and also a timestamp from the acceptance metadata 422 to identify the representative snapshot record.

Referring to FIG. 4D, link 434 and architecture 440 also allow for a repository storing snapshot records to be backfilled via a manual or automated process outside of just those created through the preset cadence of snapshots described in step 1104 of method 1100. Instead, for example, an administrative user (or other user, such as an end user of device 240) may manually trigger the snapshot server 130 to take snapshots corresponding to one or more snapshot configurations and backfill the snapshot datastore with those snapshot records. In another example, the snapshot server 130 may receive notifications from one or more other systems or devices (e.g., web server 250, admin user computing device 110, etc.) that cause the processor 205*b* of the snapshot server 130 to trigger a Snapshot™ to be taken of a particular location (e.g., URL). A webserver 250 may send such a trigger notification to the snapshot server 130, in one example, when the webserver 250 determines the properties of a file (e.g., HTML, file) corresponding to the location URL has been modified/altered. Alternatively, a trusted, third-party service provider (or an end user of a device 240) may be commissioned to or tasked with capturing and providing snapshot records (e.g., snapshot image and associated metadata together) to a snapshot server 130 for historical archiving. At least one benefit of such an arrangement with a trusted, third-party service provider is an ostensibly unbiased capture of Snapshots™ for evidentiary purposes where proof of an end user's representative GUI at acceptance of a clickwrap agreement is desired. Furthermore, in another example, a user or third-party service provider may audit stored snapshot records and mark one or more snapshot records as void, invalid, or otherwise inappropriate for use. A snapshot record may be marked as unfit as visually representative for evidentiary purposes if, for example, a graphics designer has significantly changed the look and feel and/or layout of the GUI involving the clickwrap agreement. In the system architecture 440 of FIG. 4D, the links 434 of the contract acceptance event records 436 are automatically adjusted at the time of retrieval (e.g., runtime) of snapshot records to pull the last captured and valid snapshot record, thus automatically ignoring those snapshot records that are deleted or otherwise flagged as unusable.

Figure 5:
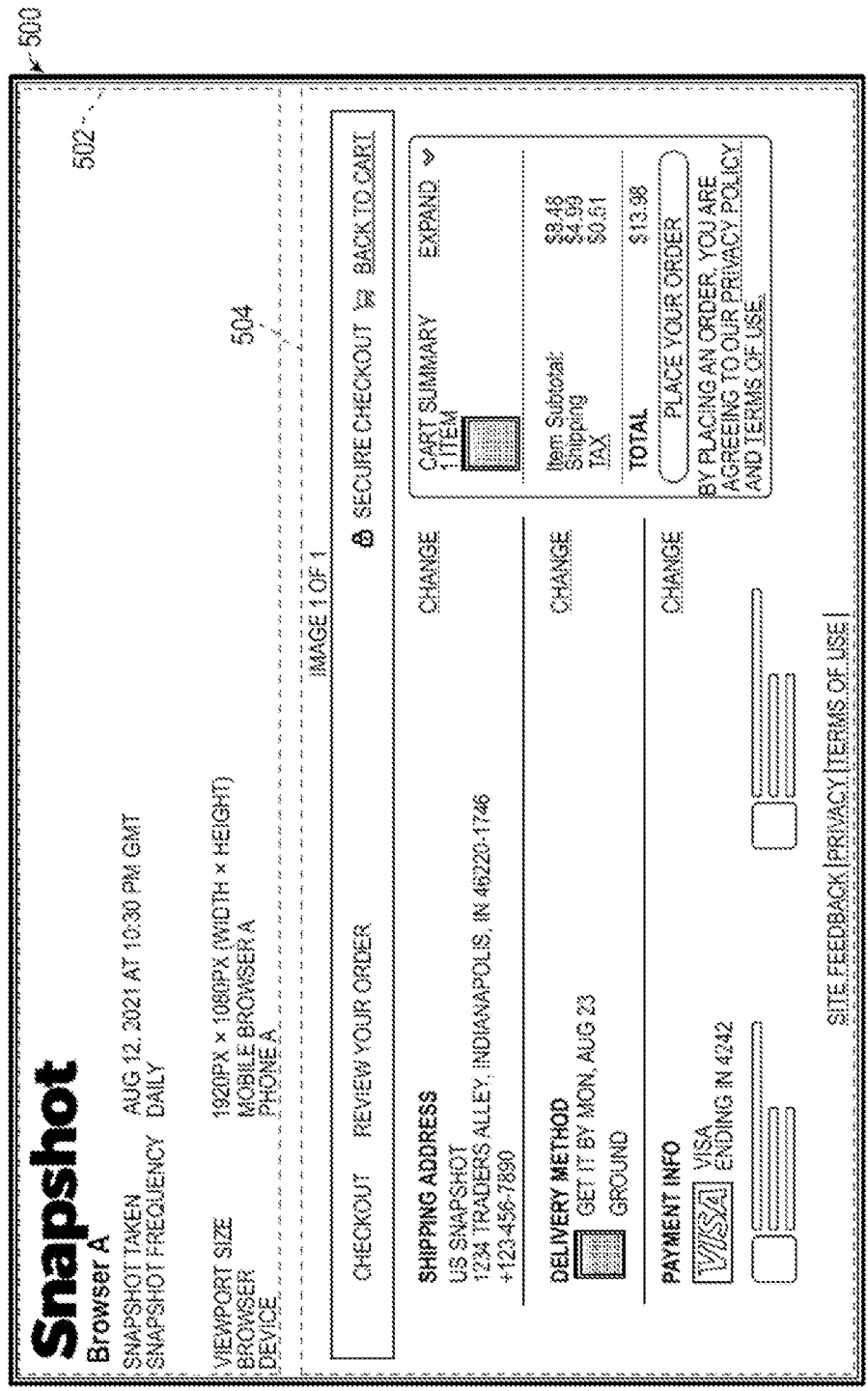
FIG. 5 shows an example image based on outputting snapshots of a graphical user interface, according to certain aspects of the present disclosure.

FIG. 5 shows an example image 500 based on outputting snapshots of a graphical user interface, according to certain aspects of the present disclosure. The example image 502 is a screenshot of a snapshot record output with an enabled snapshot of a particular internet URL. The example image 500 can include a snapshot of a webpage accessed via browser A on a computing device. The different components of the example image 500 can form a snapshot record output by a SNAPSHOTS™ platform. The snapshot record includes metadata which can be displayed via the example image 500. For example, the metadata may include a time that the snapshot was taken (e.g., year, month, day, time of day, etc.), a snapshot frequency/cadence (e.g., daily), a group name (e.g., contract group name for mobile account creation for making an online purchase), viewport size (e.g., screen dimensions), type of browser such as mobile browser, type of device such as smartphone, and/or the like. The snapshot metadata can be indicated in the metadata cover section 502. The screenshot section 504 can include snapshots indicative or representative of an interaction with the browser A on the computing device. As an example, the interaction can be a contractual transaction with an online merchant.

The SNAPSHOTS™ platform can automatically trigger capture of snapshots to represent what contract a party (e.g., a buyer) agreed to when making the purchase with the online merchant. The snapshot(s) can indicate the shipping, payment, and delivery details confirmed via the GUI that the buyer was interacting with when the purchase was agreed to. The snapshot can be captured based on a virtual machine emulation for navigating through the contractual transaction via the browser A. The virtual machine emulates the physical hardware (e.g., the computing device that browser A is running on) so that the SNAPSHOTS™ platform can script the buyer's behavior to perform steps to proceed to the GUI that represents the buyer's assent to the contractual transaction (e.g., a clickwrap contract agreement page). As an example, the GUI that is the subject of the capture snapshot(s) indicates that the buyer would click "place your order" and consequently agree to a customer computing platform's privacy policy and terms of use.

In this way, the SNAPSHOTS™ platform can generate representative snapshots/screenshots that associate buyer or user activity on the customer computing platform with the representative snapshots. That is, taking snapshots via a snapshot config associated with a particular contract group as described herein can associate buyer/user activity with snapshots of GUIs for conducting a contractual interaction and the corresponding agreed to terms and conditions of that contractual interaction. The screenshot section 504 can illustrate the navigation complexity of accessing a GUI that is representative of a contracting party's agreement, such as a clickwrap agreement webpage for placing an online order and agreeing to the contractual terms and conditions of that online order. The virtual machine emulation described herein advantageously may script the navigation flow required to access such clickwrap agreements and other desired GUIs that require navigation on a physical computing device running webpages of a web browser or native application pages of a native application to the physical computing device.

Figure 6:
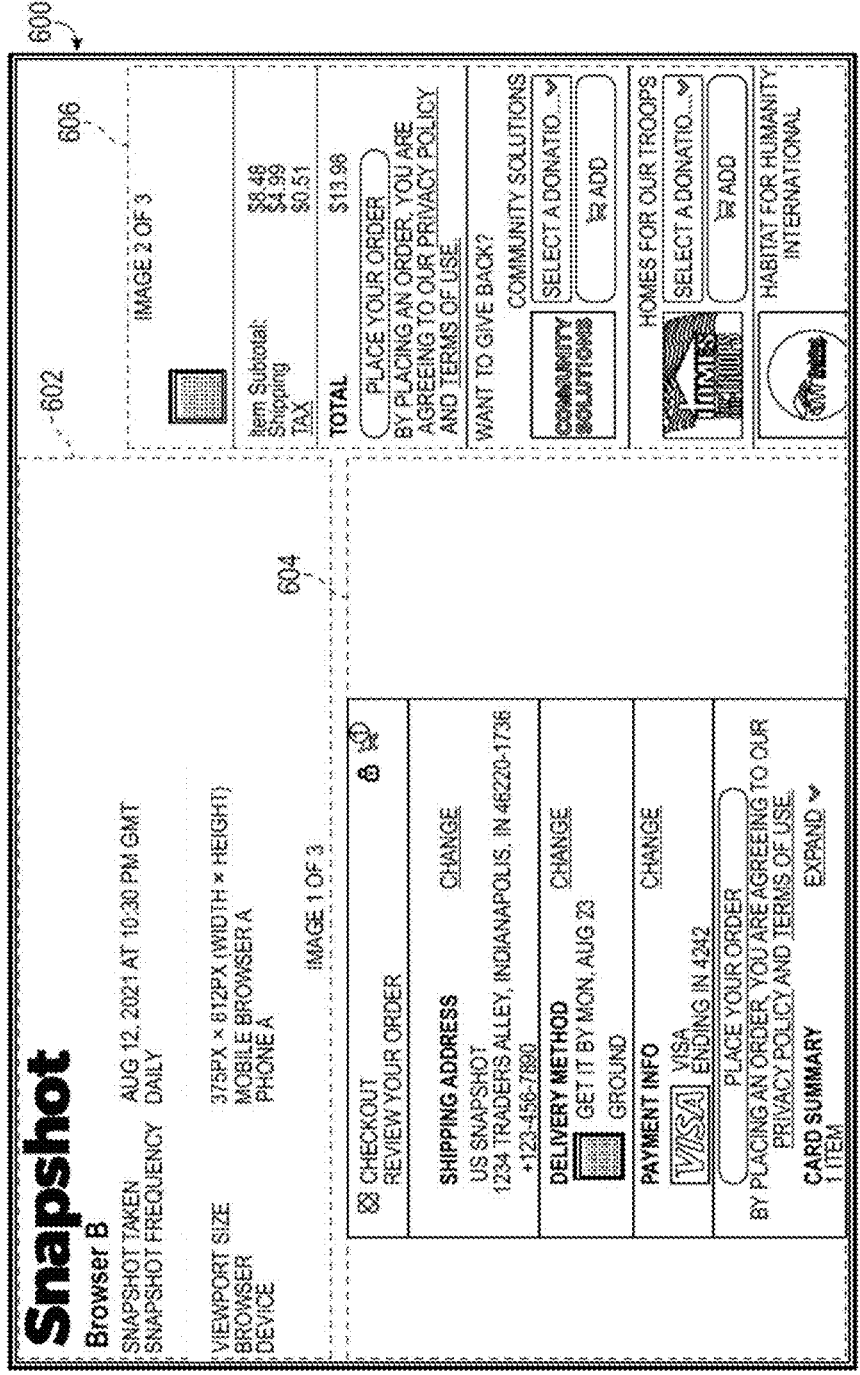
FIG. 6 shows an example image based on outputting snapshots of a graphical user interface, according to certain aspects of the present disclosure.

FIG. 6 shows an example image 600 based on outputting snapshots of a graphical user interface, according to certain aspects of the present disclosure. The example image 600 can be similar to the example image 500, but correspond to a snapshot record for snapshots taken via a browser B. As an example, the screenshot section 504 of FIG. 5 may be indicative of snapshots taken of GUIs on a web browser of a personal computer. In contrast, the screenshot sections 602, 604, 606 of FIG. 6 may be indicative of snapshots taken of GUIs on a mobile computing device such as a smartphone. The snapshots of the screenshot sections 602, 604, 606 can capture what pages were displayed to a user or buyer making an online purchase on their smartphone, for example. The pages may also be rendered on application pages of a native application running on the smartphone. As discussed herein, a runner component of a SNAPSHOTS™ platform may be capable of initiating and executing a virtual machine emulation to access the pages representative of a commercial transaction, such as a clickwrap agreement page indicative of the user or buyer placing and agreeing to the contract governing the online purchase. The snapshot of the contract acceptance can be associated or cross referenced with the corresponding contract group that contains applicable terms and conditions as well as other pertinent contract information.

Figure 7:
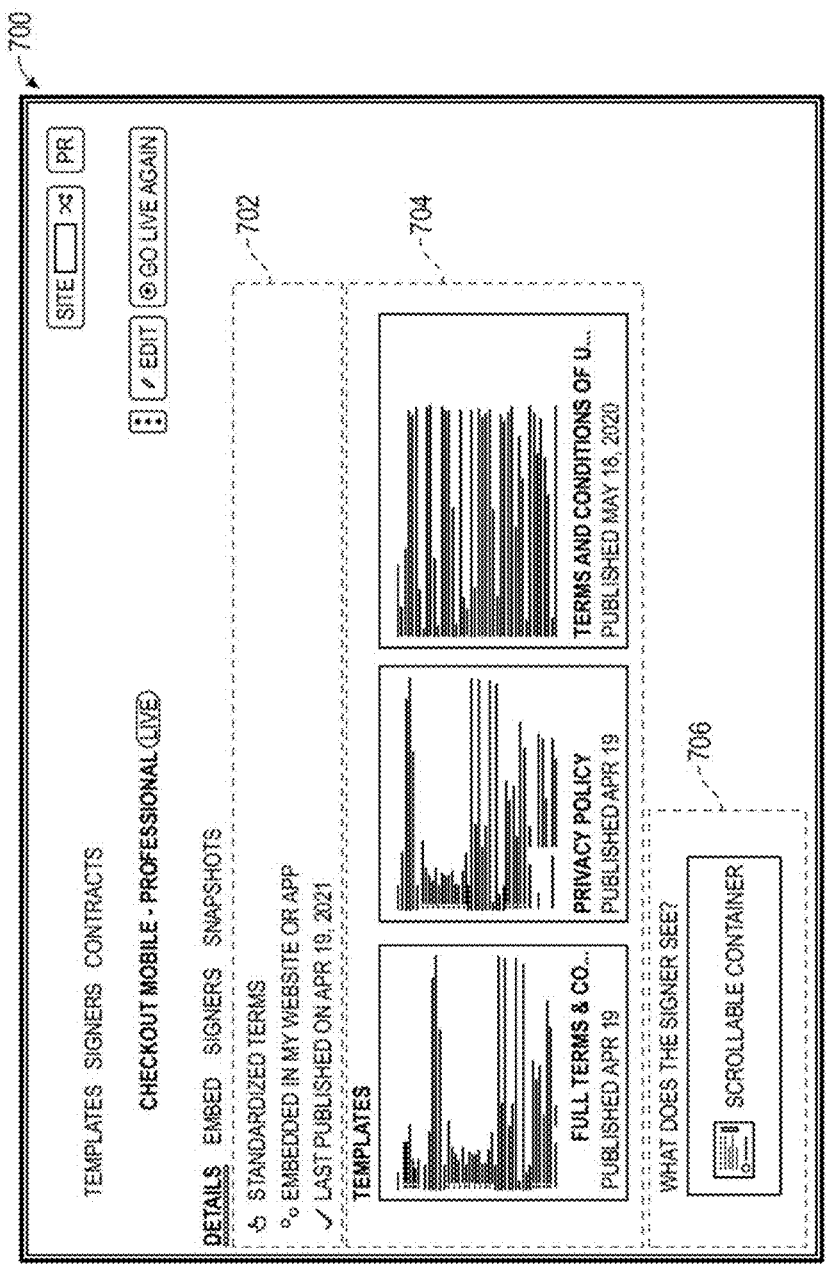
FIG. 7 shows an example image based on outputting snapshots of a graphical user interface, according to certain aspects of the present disclosure.

FIG. 7 shows an example image 700 based on outputting snapshots of a graphical user interface, according to certain aspects of the present disclosure. The example image 700 may be a mobile checkout page rendered by a SNAPSHOTS™ platform. The mobile checkout page can include sections 702, 704, 706 containing contract information and a scrollable page illustrative of what a representative user or contract counterparty would see on pages rendered via a customer computing platform. The contract metadata section 702 may include contract information, such as what version of a contract agreement is being used, what terms (e.g., standard terms and conditions) are used, whether the terms are in a website or app embedded section (e.g., as clickwrap), when the contract information was last published, and/or the like. The templates sections 704 may contain screenshots of the full text of contract provisions that the representative user or contract counterparty would view and/or agree to. Such contract provisions can include full terms and conditions, privacy policy, and/or limited terms and conditions. The templates sections 704 can indicate when the corresponding text of the contract provisions was published to the customer computing platform. The scrollable container 706 may represent what would appear in a GUI that the representative user or contract counterparty would navigate to engage in a contractual interaction via the customer computing platform.

Figure 8:
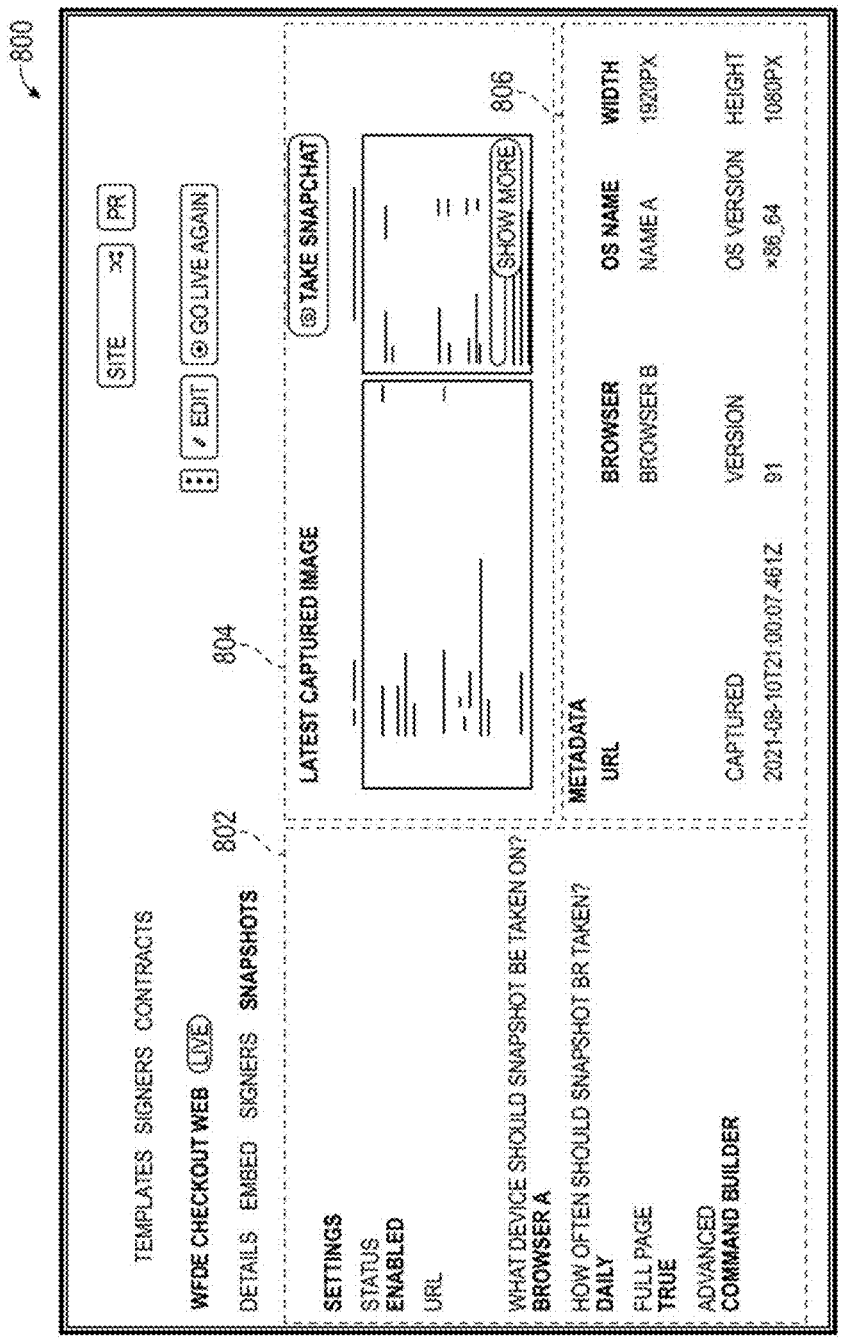
FIG. 8 shows an example settings page based on outputting snapshots of a graphical user interface, according to certain aspects of the present disclosure.

FIG. 8 shows an example settings page 800 based on outputting snapshots of a graphical user interface, according to certain aspects of the present disclosure. The example setting page 800 includes settings to enable automatic capture of snapshots as well as a link to a more complicated command builder, such as for complex navigation flows. The example setting page 800 includes sections 802, 804, 806 such as for indicating snapshot settings, metadata, and a most recently captured image. For example, the example setting page 800 may be output based on a webhook updating contract groups with a remote stored snapshot and metadata. The metadata can include snapshot location such as where the most recently captured snapshot is stored in cloud storage as well as timestamp, display settings, and other metadata described herein. The example setting page 800 may associate contract groups with their respective last successfully captured snapshot. In this way, new activity can be associated with the contract group. For example, new contract transactions or updates to contract terms can be associated with the most recent captured snapshot and the corresponding contract group.

The snapshot capture section 804 of the example setting page 800 displays this most recent captured snapshot. The most recent captured snapshot may include more than one GUI screens, for example. The snapshot capture section 804 may also enable users to select a "take snapshot" graphical icon for manually triggering capture of a snapshot rather than based on a cadence or frequency specified by a snapshot config. The metadata can be shown in metadata section 806 and can form a representative snapshot record. The metadata can include a URL of a customer computing platform (e.g., URL used to access pages for conducting a contractual interaction such as an online purchase), browser type, operating system name, dimensions of the snapshot (e.g., width and height of viewport used to display GUIs), timestamp (e.g., snapshot capture time), version, operating system version, and/or the like. The settings section 802 can indicate snapshot parameters, such as specified by an operator of the customer computing platform. The snapshot parameters may include an option to enable snapshots, what URL snapshots should be taken from, what type of device snapshots are taken on (e.g., desktop browser), cadence/frequency of snapshot capture (e.g., daily), whether the snapshots are full page, and/or the like.

Figure 9A:
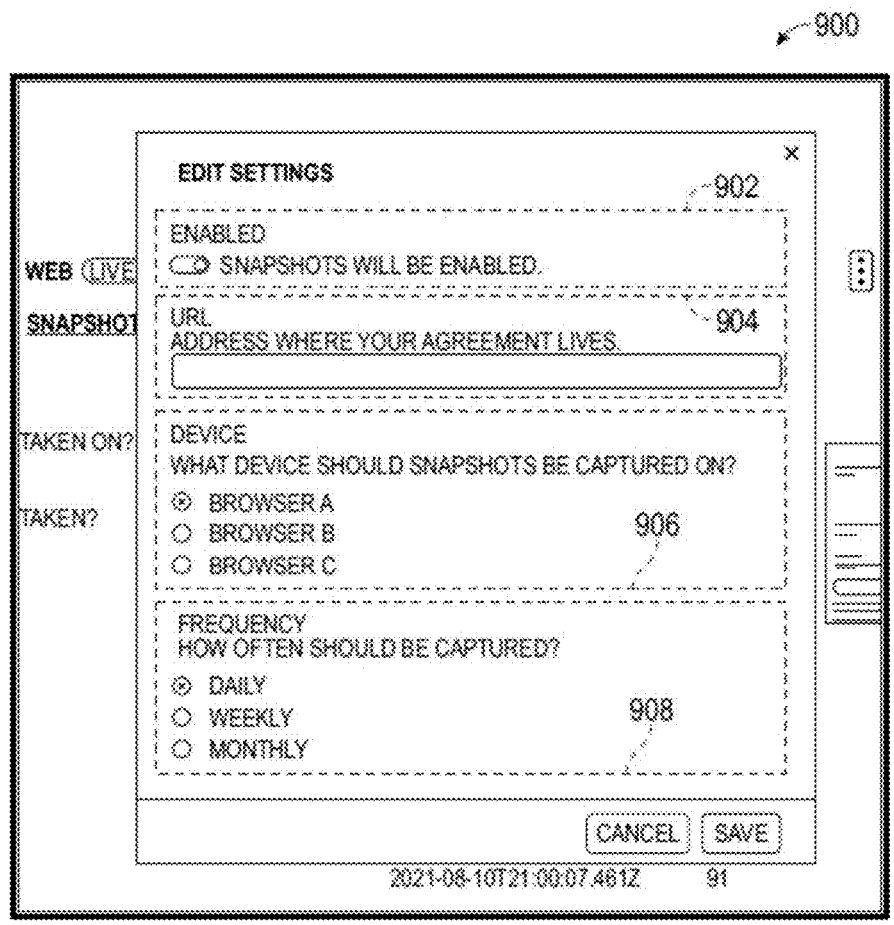

FIG. 9A shows an example settings page 900 of an example SNAPSHOTS™ platform, according to certain aspects of the present disclosure. The example settings page 900 may be similar to the settings section 802 of FIG. 8. The example settings page 900 includes an enable section 902 for manipulating a slider bar that can activate or deactivate enablement of snapshot capture. The example settings page 900 includes a URL section 904 that contains a text box configured to accept user input, such as a URL of a webpage that contains a contract agreement. For example, the input URL can be used to access a clickwrap page that contains the terms and conditions of the contract agreement, such as for governing online shopping conducted on webpages of a customer computing platform. The example settings page 900 includes a device section 906 that contains radio buttons selectable for indicating what type of physical device that snapshots should be captured on. For example, the different types of physical devices can run different types of browser A, B, and/or C, which could be desktop browsers or mobile browsers, etc.

The different types of physical devices can be used to navigate to the URL where the contract agreement exists as well as the URL containing the clickwrap or other screen at which a buyer or counterparty can indicate agreement to the contract and assent to the corresponding terms and conditions. As discussed herein, the navigation to the URL can be scripted by a virtual machine. The virtual machine may emulate the navigation flow necessary to navigate to the URL or page used for acceptance of the contract, such as by downloading a native app from an app store, entering login credentials, moving from one webpage to another, clicking pages or graphical icons, and/or the like. The example settings page 900 includes a cadence section 908 which can specify the frequency at which snapshots should be captured. For example, selectable frequencies can include daily, weekly, monthly, or some other suitable frequency.

Figure 9B:
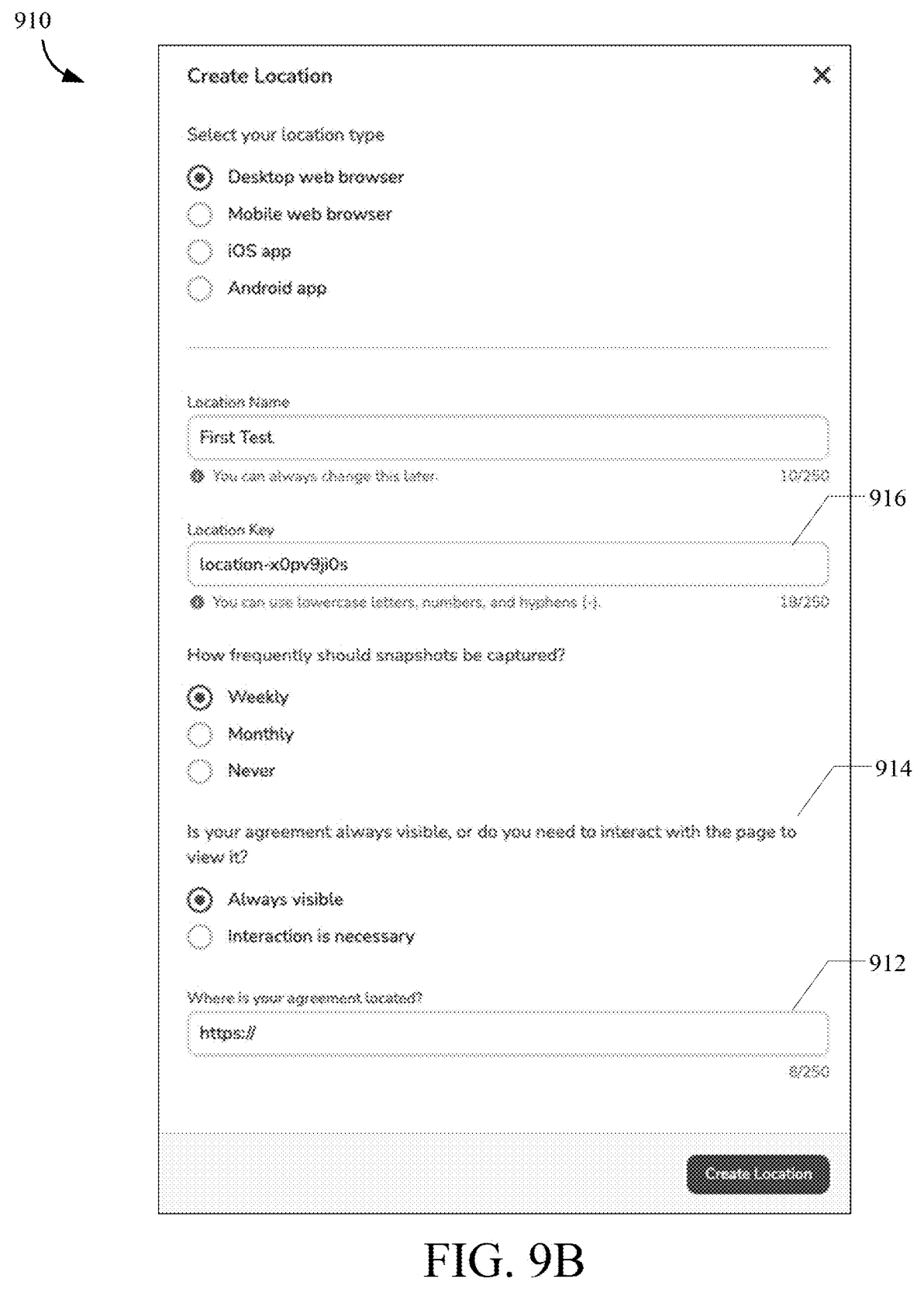

FIG. 9B shows an example settings page 910 of an example SNAPSHOTS™ platform, according to certain aspects of the present disclosure. The example setting page 910 allows an administrative user of an computing device 110 to create a location parameter for a snapshot configuration 402 for a snapshot server 130. The snapshot configuration 402, which is associated with a contract group 404 for a clickwrap agreement, may be populated with parameters, as shown on the setting page 910, including but not limited to at least one of a snapshot frequency, the location type (e.g., a type of the end user computing platform, an operating system, etc.), a location 912 where a contract group element is embedded, navigation instructions, and/or other parameters.

Referring to FIG. 9B, as in the example of FIG. 4A, the snapshot config 402 may be created with information corresponding to a web browser or a native application. For example, for a browser, the snapshot config may be created with information identifying a physical device, a page URL, a cadence, headers, and/or instructions. The page URL can indicate the location 912 of a clickwrap agreement corresponding to a contract group 404, which can contain contractual information (e.g., terms and conditions) of a clickwrap agreement accessed from a webserver 250 accessible via a browser of an end user computing device 240. The location key 916 is a unique identifier (ID), key, or name used to identify the particular snapshot configuration 402. In some embodiments disclosed herein, the location key 916 is sometimes referred to as a snapshot configuration key. In other embodiments, the location key 916 or variations of it are referred to as a contract group element. When the contract group element (e.g., a snapshot configuration key) is embedded in or provided by a page (e.g., webpage or native application) and sent to the snapshot server 103, the snapshot server 103 is able to identify the contract group and clickwrap agreement corresponding to the location key 916. In addition, instructions 914 of the snapshot config 402 can also be passed to a runner for navigation through the browser for setting up capture of snapshots. For example, the instructions can control the SNAPSHOTS™ platform to perform more complex navigation flow instructions such as populating credentials into a text box and triggering a continue text box/button. Such complex navigation steps can be performed via a virtual machine 120 that emulates the type of physical device rendering pages of an end user computing device 240. Although not expressly shown in FIG. 9B, the snapshot configuration 402 may also be setup by an administrative user to include headers that are passed to the snapshot server 130 with network calls invoked by a runner to capture snapshots. In one example, the headers can be security tokens, authorization tokens, and/or the like corresponding to the end user computing device 240. The tokens may be retrieved and used by a virtual client computing device 120 emulated by the snapshot server 130 to log into webpages/web sites or native applications that require authentication before access.

Figure 10A:
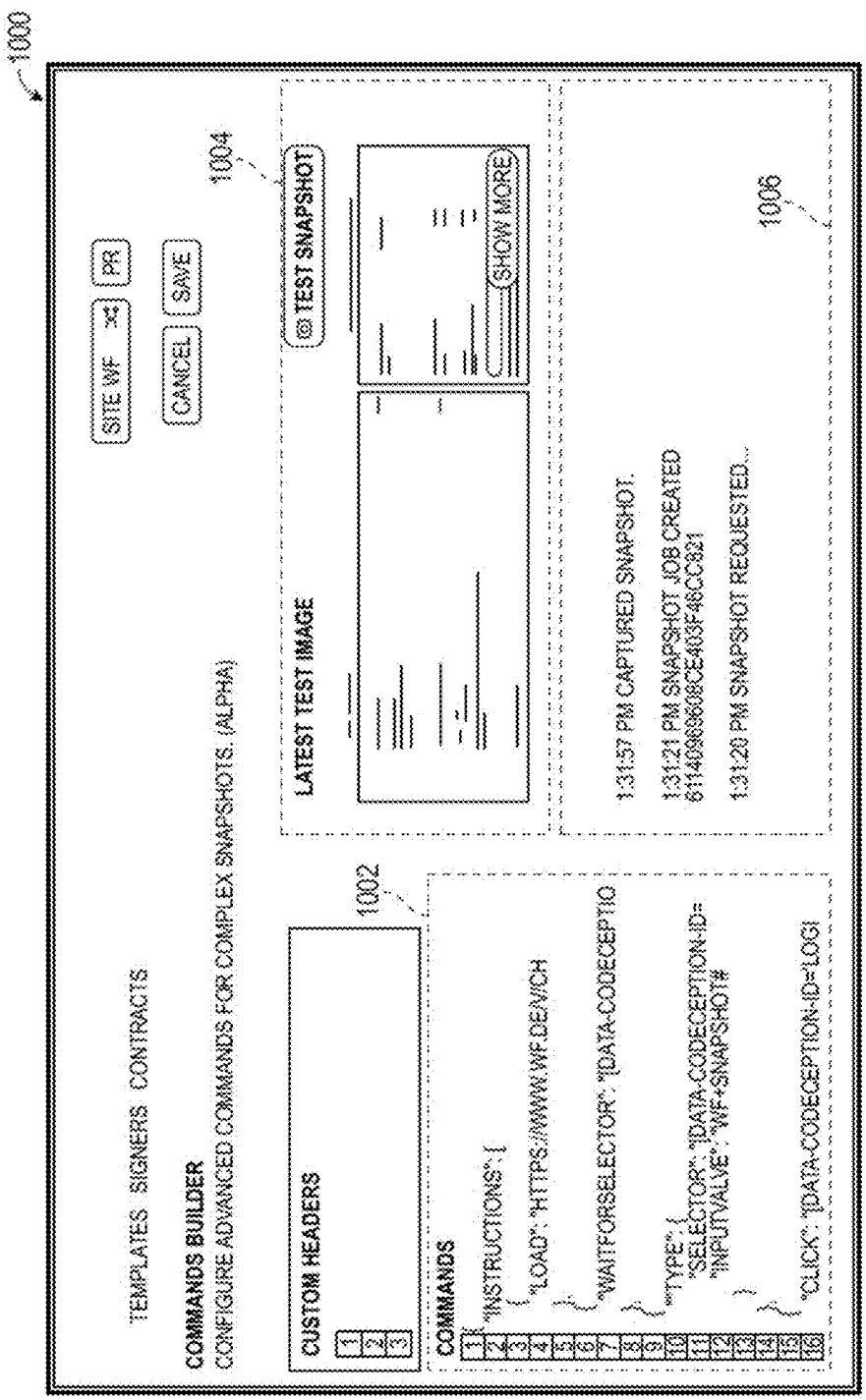

FIG. 10A shows an example commands builder 1000 of an example SNAPSHOTS™ platform, according to certain aspects of the present disclosure. In one example, the navigation instructions in the parameters of the snapshot configuration may include selectable commands via a commands builder. The example commands builder 1000 can be used to configure advanced commands for complex snapshots, such as to specify commands for scripting a complex navigation flow via a virtual machine emulation of a physical device used to access GUIs that are the subject of snapshots. Any custom headers can be specified in a custom header section, such as security tokens or authorization tokens necessary to login to or access pages of a customer computing platform. The complex navigation flow can be scripted in the command section 1002. For example, the command section 1002 can include instructions to load a native application or page, wait for a selector such as waiting for typing of login credentials such as an email and password to access the native application or restricted page of the customer computing platform (e.g., to log into a user's account on an online merchant's customer computing platform), and click "continue."

This complex navigation flow models or simulates a representative user's navigation through the application or pages of the online merchant's customer computing platform to login to their user account for shopping, selecting, and/or making a purchase, for example. The action of clicking "continue" can enable access to a clickwrap agreement or other GUI that shows contractual terms and conditions and/or demonstrates acceptances of those terms and conditions. The GUI(s) that show what terms and conditions were agreed to as well as demonstrate counterparty assent to a formed contract may be displayed in the test image section 1004 as test snapshots. The test image section 1004 may also enable operators of the customer computing platform to select a "test snapshot" graphical icon for viewing what a manual or automatic triggered capture of a snapshot would look like. In some optional examples, an execution section 1006 may be provided to an admin user to indicate which commands or instructions were executed and other information.

FIG. 10B shows an example commands builder 1010 of an example SNAPSHOTS™ platform, according to certain aspects of the present disclosure, in which a commands builder page for an admin user includes fields for customer headers, instructions, and wait times. In one example, the graphical user interface 1010 for the admin user includes navigation instructions for including as parameters of the snapshot configuration include commands a load URL command, a wait for selector command, and/or a capture snapshot command.

Figure 11A:
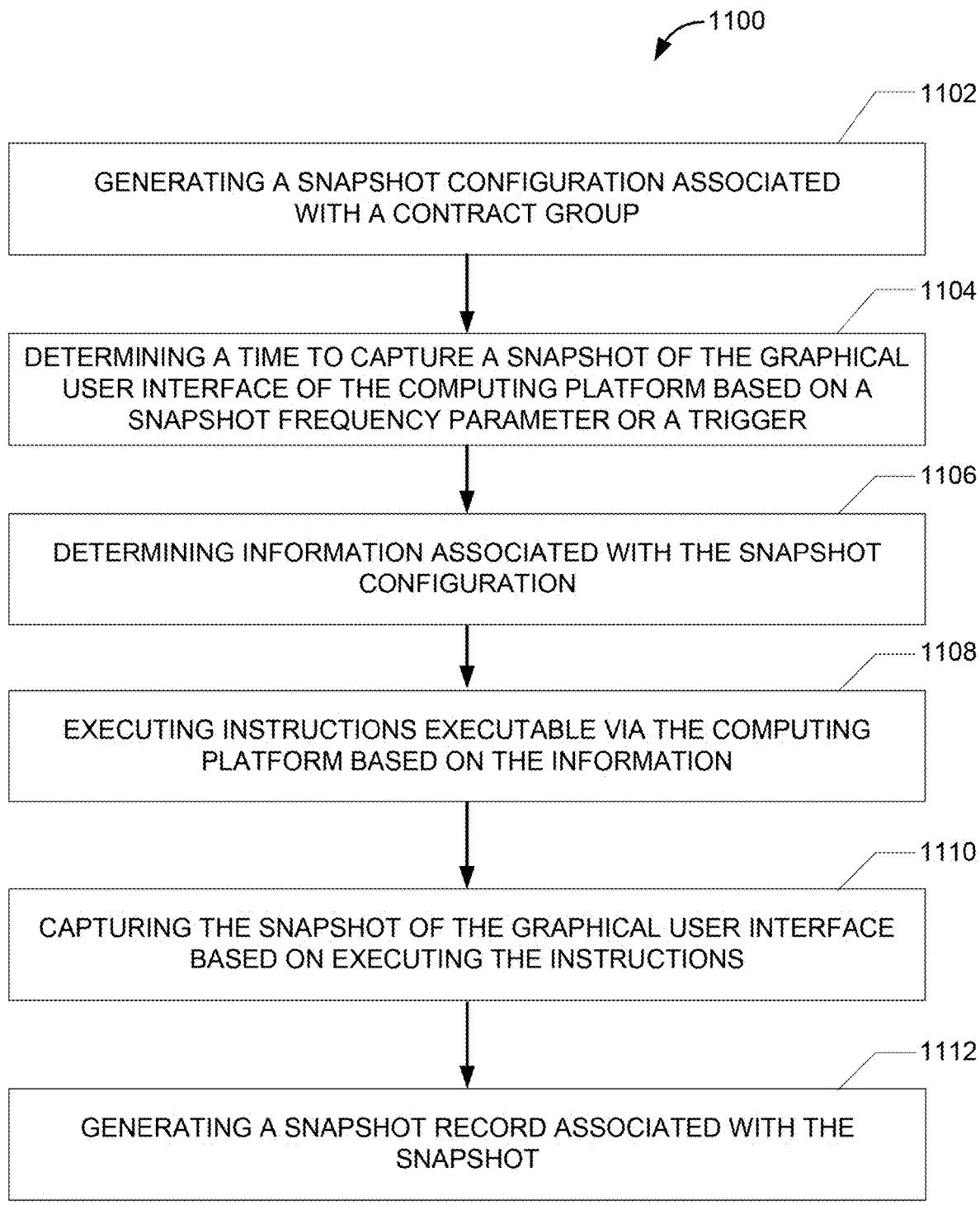
FIG. 11A and FIG. 11B (collectively "FIG. 11") are example flow diagram for outputting snapshots of a graphical user interface, according to certain aspects of the present disclosure.
Figure 11B:
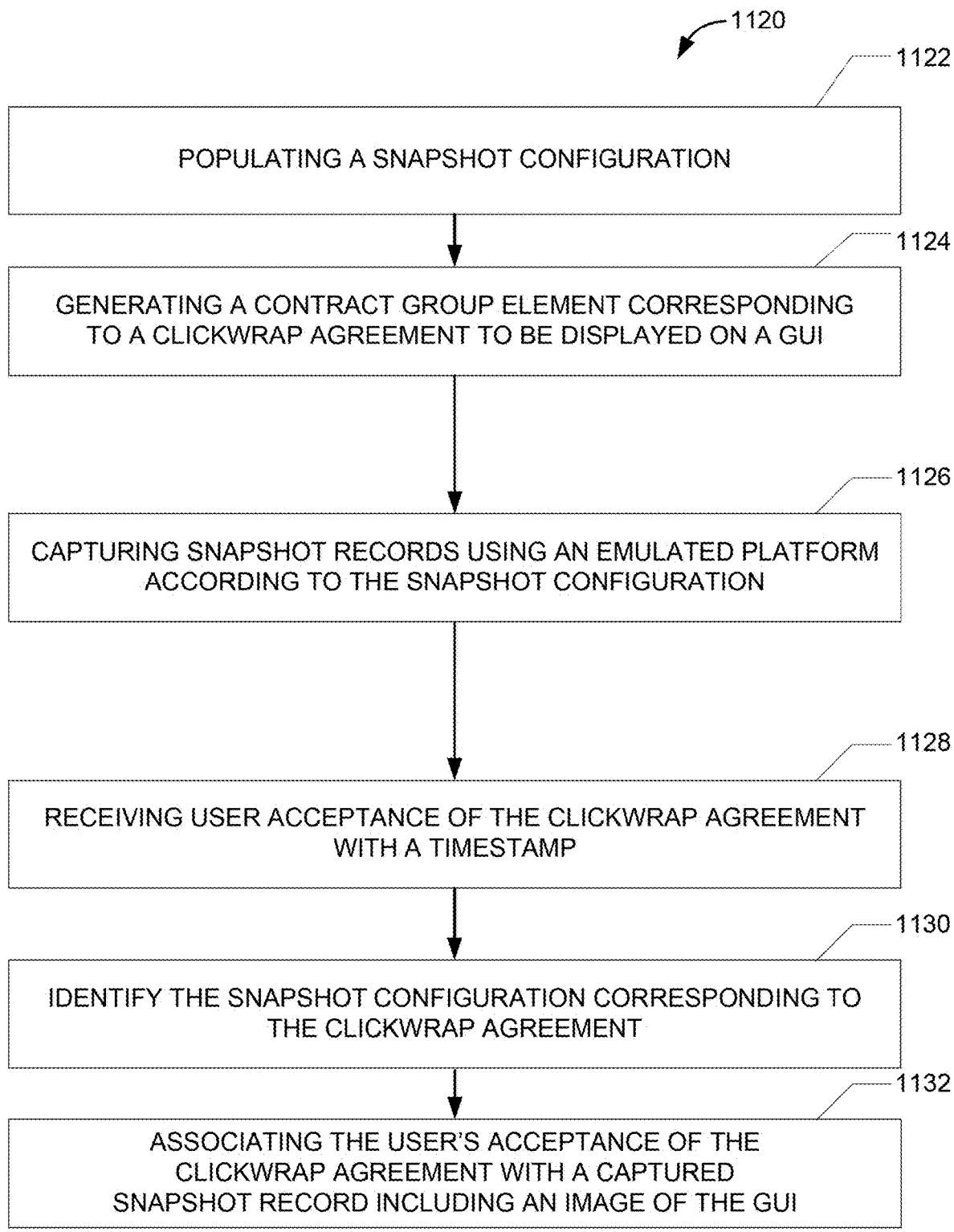

FIG. 11A and FIG. 11B (collectively "FIG. 11") illustrate example flow diagrams (e.g., processes 1100, 1120) for sending content via a computing platform, according to certain aspects of the disclosure. For explanatory purposes, the example processes 1100, 1120 are described herein with reference to one or more of the figures above. Further for explanatory purposes, the blocks of the example processes 1100, 1120 are described herein as occurring in serial, or linearly. However, multiple instances of the example processes 1100, 1120 may occur in parallel, overlapping in time, almost simultaneously, or in a different order from the order illustrated in methods 1100, 1120. In addition, the blocks of the example processes 1100, 1120 need not be performed in the order shown and/or one or more of the blocks of the example processes 1100, 1120 need not be performed. For purposes of explanation of the subject technology, the processes 1100, 1120 will be discussed in reference to one or more figures above. As an example, the processes 1100, 1120 may be performed at least partially by or via the exemplary network architecture 100 in FIG. 1, the example computing networks 200, 260 in FIG. 2, the example computer system 300 in FIG. 3, or the example computer system 1200 in FIG. 12 described below. Accordingly, at least some of the steps in processes 1100, 1120 may be performed by a processor executing commands stored in the example computing platform(s) 302, for example. The example processes 1100, 1120 may be for outputting Snapshots™ of a graphical user interface.

Referring to FIG. 11A, at step 1102, a snapshot configuration 402 associated with a contract group 404 may be generated, and the contract group element (e.g., a snapshot configuration key) corresponding to the contract group may be published to a computing platform. For example, the contract group element can be an embedded and/or published contract configuration such that a reference to the snapshot configuration is associated with a contract group element. Additionally or alternatively, a particular instance of a snapshot configuration may be set before the time of acceptance of a corresponding clickwrap contract agreement. According to an aspect, generating the snapshot configuration comprises determining at least one of: a type of the computing platform, a location of the contract group element, a webpage universal resource locator (URL), a mobile application name, a mobile device operating system, a type of network browser, a header, a navigation instruction, or a frequency of snapshot capture. According to an aspect, generating the snapshot configuration comprises saving the snapshot configuration; and associating (e.g., attaching or otherwise associating) the snapshot configuration to the contract group element. At step 1104, a time to capture a snapshot of the graphical user interface of the computing platform may be determined based on a snapshot frequency parameter or a trigger associated with the snapshot configuration. For example, the time to capture the snapshot can be a time of day, a frequency (e.g., cadence), time interval etc. The time to capture the snapshot can be based on the frequency and a timestamp of a last successfully captured snapshot. According to an aspect, determining a time to capture the snapshot comprises loading (e.g., via a worker service) a published snapshot configuration associated with a published contract group. As an example, the trigger may be implemented by a server 250 to periodically capture snapshots based on the time to capture.

At step 1106, a virtual machine that emulates the computing platform for navigation of an application rendered on the computing platform may be created. For example, the virtual machine may emulate an operating system or website browser of the computing platform. As an example, the computing platform may determine the information associated with the snapshot configuration. The computing platform may read, based on the snapshot configuration being a valid snapshot configuration in a queue, the snapshot configuration to determine at least one of: header information, navigation information, or computing platform information associated with the snapshot. For example, the computing platform information may include a bundle identifier, website information, desktop information, mobile information, and/or the like. At step 1108, instructions that are executable via the computing platform may be executed via the virtual machine and based on the information. At step 1110, the snapshot image of the graphical user interface may be captured based on execution of the instructions and saved in remote storage 412.

At step 1112, a snapshot record comprising the snapshot (e.g., snapshot image) and metadata associated (e.g., bundle identifier, webpage information, mobile information, and/or the like) with the snapshot may be generated based on capturing the snapshot. In one example, the step of generating the snapshot record may comprise also uploading the snapshot record to a remote memory for storage and purposes of evidentiary proof. In other examples, a snapshot record is comprised of both a snapshot image, which is stored in remote memory, in addition to snapshot metadata from a database, which may or may not be remote, but the snapshot record (or a PDF record) itself is not required to be saved in the remote memory. According to an aspect, the process 1100 may further include sending, to an application programming interface (API), the metadata and an uploaded location of the captured snapshot, such as via a webhook or API call. For example, the metadata may comprise at least one of: snapshot timestamp, user agent information, screen viewport, webpage universal resource locator (URL), screen resolution, native application name (e.g., mobile application), or native application version. According to an aspect, the process 1100 may further include selecting an application function based on the virtual machine 120 emulating physical hardware corresponding to the computing platform. For example, application functions can include but are not limited to selecting merchandise to purchase via the end user computing platform, setting user preferences via the platform, navigating to screens rendered by the platform, and/or the like. According to an aspect, the process 1100 may further include navigating to a screen (e.g., login page, anchor page) of the application via the virtual machine 120 to access the graphical user interface. According to an aspect, the process 1100 may further include associating the snapshot record with the contract group element or snapshot configuration key. The association may be made based on a webhook or API call. As an example, a local property of the snapshot record may be associated with the contract group element (e.g., a snapshot configuration key) associated with the webpage or application page when the contract acceptance event occurs on the emulated client device on the virtual machine 120. This enables dynamic association or mapping based on a time stamp of the contract acceptance event and a latest available snapshot (416 to 416n) corresponding to the time stamp. In some examples, the time stamp recorded in the resulting snapshot record may be based on a time of capture (i.e., captured_time) instead of based on the time of acceptance of the clickwrap agreement. According to an aspect, the process 1100 may further include associating activity corresponding to the contract group element with a last captured snapshot (e.g., screenshot image).

Referring to FIG. 11B, an illustrative method 1120 is disclosed for recording an evidentiary history of a clickwrap agreement embedded in the GUI of an end user computing platform displaying a clickwrap agreement. While the captured image in a snapshot record might not be the exact same GUI as that displayed to each and every end user, the snapshot record and its snapshot image are visually representative of the GUI displayed to the end user for purposes of evidentiary proof/history. In particular, the snapshot image includes the GUI used by an end user to accept (and/or leading up to the acceptance of) the clickwrap agreement. The action of accepting the clickwrap agreement may come in different forms including but not limited to the user checking a checkbox on the GUI, the user clicking a button on the GUI, or other actions (or affirmative lack of action, such continuing to navigate to other pages on the website) by the user. Overall, the method for recording an evidentiary (version) history of a clickwrap agreement embedded in the GUI may comprise three (or more or less) chronological stages of steps. The number of stages may vary depending on whether steps in particular stages are conflated, divided, or otherwise altered as appropriate.

In a first stage, an administrative user using a computing device 110 sets up the clickwrap agreement for the SNAPSHOTS™ feature using a contract group 404 and one or more snapshot configurations (402 to 402*n*) associated with the contract group, and by embedding a contract group element (e.g., a snapshot configuration key) as appropriate. In step 1122, a snapshot configuration 402, which is associated with a contract group 404, may be populated with various parameters. The parameters may include but are not limited to: at least one of a snapshot frequency or a triggering acceptance event for the clickwrap agreement, a type of the end user computing platform, an operating system of the end user computing platform, a location where a contract group element is embedded, navigation instructions, and/or other parameters.

Furthermore in the first stage, in step 1124, a contract group element may be generated that is configured to be embedded on a page (e.g., a mobile application page, a webpage, or other container for visual elements) that, when rendered by the end user computing platform, causes the graphical user interface of the end user computing platform (i.e., visual graphics and text on the screen of the end user computing platform) to display the clickwrap agreement (i.e., displaying the contents of the clickwrap agreement or even a link that causes the content of clickwrap agreement to be displayed). As explained herein, the contract group element may be client-side code, such as Javascript or HTML, that may be embedded in the webpage located at the location parameter (e.g., URL) in the associated snapshot configuration. A unique identifier (e.g., a key 916) may be assigned to the snapshot configuration 402 by the snapshot server 130 so that the administrative user may embed (or otherwise include) the unique identifier in the end user's GUI with the clickwrap agreement and/or the user controls (e.g., button, checkbox, etc.) that an end user would trigger to indicate acceptance of the clickwrap agreement. In another example, the administrative user may label the key 916 themselves using a settings page 910 provided by the snapshot server 130. In some examples, the key 916 may be referred to as a snapshot configuration key. As a result, the combination of the value of the contract group element, snapshot configuration key, and other metadata, such a captured_time timestamp, make it possible to pinpoint which online clickwrap agreement was accepted and when.

In a second stage, in step 1126, the system 260 emulates an end user computing platform using a virtual machine 120 to capture snapshot records according to the snapshot configurations. The snapshot server 130 stores in memory 220*b* the snapshot records captured by an emulated platform 120 reflecting the snapshot configuration. As explained with respect to FIG. 4, a snapshot record 416 may comprise metadata 222 and snapshot image 414. A plurality of the snapshot records (416 to 416*n*) are captured over time at a desired cadence and stored for a given snapshot configuration 402. While each snapshot configuration is associated with a contract group, each contract group 404 may have multiple snapshot configurations (402 to 402*n*) associated with it to accommodate different end user computing devices/platforms that have different metadata or visual designs. After completion of step 1126, a data store communicatively coupled to the snapshot server stores snapshot records corresponding to the variations of the end user computing platforms setup by the administrative user as accessing the clickwrap agreement. Because the administrative user created the snapshot configuration in the first stage of method 1120 with the contract group element (e.g., key 916), each of the snapshot records 416 are directly (or indirectly) associated through contract group element to the corresponding snapshot configuration and contract group, thus ultimately the clickwrap agreement.

In a third stage, at a time after the snapshot records have been created and stored in a data store of the snapshot server, in step 1128, the snapshot server 130 receives notification of an end user accepting the clickwrap agreement. The acceptance event indicates the end user accepted the clickwrap agreement on a webpage (or other application page) at a location parameter (e.g., URL) at a particular date and time. The acceptance event may also include a snapshot configuration key that is associated with the snapshot configuration. The clickwrap agreement was setup in the preceding steps in the method 1120 so that the snapshot configuration key is a unique identifier for the relationship. The notification of the acceptance event may occur as a result of the end user indicating acceptance (e.g., by checking a checkbox, clicking a button, or other actions) of the contract group element embedded at the URL of the webpage hosted on a webserver. A timestamp of the acceptance is included in the acceptance event and/or the notification of the acceptance event received at the snapshot server. The received acceptance event may comprise acceptance metadata of an end user computing device of the end user. The acceptance metadata may comprise a timestamp for when the end user accepted the clickwrap agreement and/or a reference to a given snapshot configuration that corresponds to the configuration for which the user was interacting Furthermore, in the third stage, at step 1130, the snapshot configuration 404 corresponding to the end user's acceptance of the clickwrap agreement is identified when an administrative user of the snapshot server defines/creates a snapshot configuration 402 to associate it with the clickwrap agreement through the contract group 404. In one example, the contract group element on the page rendered in a GUI to the end user at acceptance may identify the particular snapshot configuration corresponding to the contract group for the accepted clickwrap agreement. Then, the snapshot server, through the administrative user, may identify one or more snapshot configurations associated with that contract group by a reference identifier (ID), key, or name in the data store communicatively coupled to the snapshot server. Then to pinpoint which of the one or more snapshot configurations matches the behavior and operation of the end user computing platform, at step 1130, the snapshot server 130 searches on the key (e.g., contract group element) to find the snapshot configuration 402. As an aside, the parameters of the snapshot configuration should correspond to those of the acceptance metadata 422. For example, if the type (e.g., mobile device, laptop, or other) of the end user computing platform, the operating system (e.g., Apple iOS, Android OS, Microsoft Windows, or other) of the end user computing platform, and other parameters in the snapshot configurations match those identified by the administrative user, then the corresponding snapshot configuration key is embedded in the webpage with the clickwrap agreement displayed by the webserver 250. As such, the type of the end user computing platform corresponds to the acceptance metadata and also the snapshot metadata associated with the selected snapshot configuration by the key.

In an alternate embodiment of the third stage, the snapshot server may attempt to identify the snapshot configuration associated with the clickwrap agreement. In one example, the contract group element on the page rendered in a GUI to the end user at acceptance may identify the particular contract group for the accepted clickwrap agreement. Then, the snapshot server may identify one or more snapshot configurations associated with that contract group by a reference ID or name in the data store communicatively coupled to the snapshot server. Then to pinpoint which of the one or more snapshot configurations matches the behavior and operation of the end user computing platform, at step 1130, the snapshot server may compare the snapshot parameters of each of these snapshot configurations to the acceptance metadata. For example, if the type (e.g., mobile device, laptop, or other) of the end user computing platform, the operating system (e.g., Apple iOS, Android OS, Microsoft Windows, or other) of the end user computing platform, and other parameters in the snapshot configurations match those in the acceptance metadata, then a single snapshot configuration is identified as matching the acceptance metadata of the end user's acceptance event. However, as explained in the preceding example, if an admin user has setup the relationships shown in FIG. 4, then the snapshot configuration key may obviate the need to filter and search for the specific snapshot configuration for the clickwrap agreement and the specific characteristics/metadata of the end user computing device 240.

Next in the third stage, at step 1132, the snapshot server may associate the acceptance event with the last-captured snapshot record associated with the identified snapshot configuration. The data store of the snapshot server, in step 1126, is populated with snapshot records at a desired frequency or triggering occurrence. Therefore, assuming at least one snapshot record has already been stored in the data store before step 1132, then from among the previously-generated snapshot record for the snapshot configuration, the last-captured snapshot record that is chronologically closer after the snapshot time than any previously-generated snapshot record is selected and tied to the acceptance event. In other words, the snapshot image stored in that last-captured snapshot record is visually representative evidence of the GUI that the end user saw at the time of acceptance of the clickwrap agreement.

While the illustrative method 1120 for recording an evidentiary history of a clickwrap agreement embedded in a graphical user interface (GUI) might not necessarily validate/authenticate the end user's acceptance of the clickwrap agreement, it does provide a single source of proof of the actual contents displayed of the GUI leading up to the time of acceptance. In those (relatively infrequent) instances when there is no previously-stored snapshot record in the data store for the snapshot configuration identified in step 1130, the snapshot server may trigger execution of step 1126 for the identified snapshot configuration so that a snapshot record is generated and saved into the data store. That snapshot record, although having a timestamp a short time after (i.e., essentially contemporaneously with) the timestamp of the end user's acceptance event, may in some examples, be associated with the acceptance event for purposes of recording an evidentiary history of the clickwrap agreement for that particular contract group.

Figure 12:
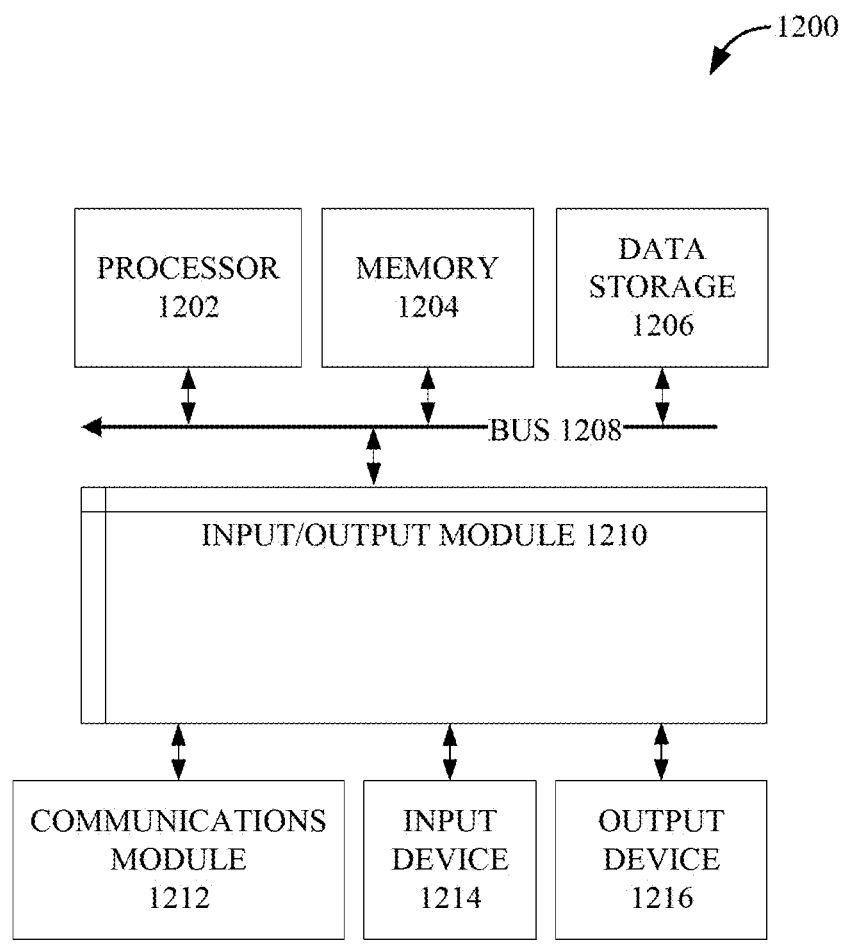
FIG. 12 is a block diagram illustrating an example computer system in which aspects of the present disclosure can be implemented.

FIG. 12 is a block diagram illustrating an exemplary computer system 1200 with which aspects of the present disclosure can be implemented. In certain aspects, the computer system 1200 may be implemented using hardware or a combination of software and hardware, either in a dedicated server, integrated into another entity, or distributed across multiple entities.

The computer system 1200 includes a bus 1208 or other communication mechanism for communicating information, and a processor 1202 (e.g., a CPU, GPU, etc.) coupled with bus 1208 for processing information. By way of example, the computer system 1200 may be implemented with one or more processors 1202. The processor 1202 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 1200 can include, in addition to hardware, code that creates an execution environment for the computer program in question, for example, code that constitutes processor firmware, a protocol stack, a database management system, an operating system, or a combination of one or more of them stored in an included memory 1204 (e.g., memory 220a-220b), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to the bus 1208 for storing information and instructions to be executed by processor 1202. The processor 1202 and the memory 1204 can be supplemented by, or incorporated in, special purpose logic circuitry.

The instructions may be stored in the memory 1204 and implemented in one or more computer program products, i.e., one or more modules of computer program instructions encoded on a computer-readable medium for execution by, or to control the operation of, the computer system 1200, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1204 may also be used for storing temporary variable or other intermediate information during execution of instructions to be executed by processor 1202.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 1200 further includes a data storage device 1206 such as a magnetic disk or optical disk, coupled to bus 1208 for storing information and instructions. Computer system 1200 may be coupled via input/output module 1210 to various devices. The input/output module 1210 can be any input/output module. Exemplary input/output modules 1210 include data ports such as USB ports. The input/output module 1210 is configured to connect to a communications module 1212. Exemplary communications modules 1212 include networking interface cards, such as Ethernet cards and modems. In certain aspects, the input/output module 1210 is configured to connect to a plurality of devices, such as an input device 1214 and/or an output device 1216. Exemplary input devices 1214 include a keyboard and a pointing device, e.g., a mouse or a trackball, by which a user can provide input to the computer system 1200. Other kinds of input devices 1214 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 1216 include display devices such as a LCD (liquid crystal display) monitor, for displaying information to the user.

According to one aspect of the present disclosure, the computing platform 100 and the architecture 300 can be implemented using a computer system 1200 in response to processor 1202 executing one or more sequences of one or more instructions contained in memory 1204. Such instructions may be read into memory 1204 from another machine-readable medium, such as data storage device 1206. Execution of the sequences of instructions contained in the main memory 1204 causes processor 1202 to perform the process steps described herein. One or more processors in a multi-processing arrangement may also be employed to execute the sequences of instructions contained in memory 1204. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 1200 can include clients and servers. A client and server are generally remote from each other and typically interact through a communication network. The relationship of client and server arises by virtue of computer programs running on the respective computers and having a client-server relationship to each other. The computer system 1200 can be, for example, and without limitation, a desktop computer, laptop computer, or tablet computer. The computer system 1200 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 1202 for execution. Such a medium may take many forms, including, but not limited to, non-volatile media, volatile media, and transmission media. Non-volatile media include, for example, optical or magnetic disks, such as the data storage device 1206. Volatile media include dynamic memory, such as the memory 1204. Transmission media include coaxial cables, copper wire, and fiber optics, including the wires that comprise the bus 1208. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for recording an evidentiary history of a clickwrap agreement embedded in a graphical user interface of an end user computing platform by associating an acceptance event by an end user with a previously-generated snapshot record comprising snapshot metadata and a snapshot image, wherein the clickwrap agreement is associated with a contract group, the method comprising:
  populating a snapshot configuration associated with the contract group with parameters comprising:
    at least one selected from a snapshot frequency, a triggering acceptance event for the clickwrap agreement, and combination thereof,
    a type of the end user computing platform, and navigation instructions;
  generating a snapshot configuration key configured to be embedded on a page that, when rendered by the end user computing platform, causes the graphical user interface of the end user computing platform to display the clickwrap agreement;
  determining, based on the snapshot frequency or the triggering acceptance event, a snapshot time to initiate capture of the snapshot image, wherein the snapshot image includes a visual representation of the graphical user interface including the clickwrap agreement;
  creating a virtual machine that emulates the end user computing platform in adherence with the parameters of the snapshot configuration;
  executing, via the virtual machine at or after the snapshot time, the navigation instructions configured to be executed via the emulated end user computing platform;
  capturing, based on executing the navigation instructions at or after the snapshot time, the snapshot image of the graphical user interface on the emulated end user computing platform;
  generating a snapshot record comprising the snapshot image and snapshot metadata associated with the emulated end user computing platform adhering to the parameters of the snapshot configuration;
  storing the snapshot record in a data store;
  at a time after the snapshot time, receiving an acceptance event in response to the end user accepting the clickwrap agreement on the page, wherein the acceptance event comprises acceptance metadata of an end user computing device of the end user;
  identifying the snapshot configuration associated with the snapshot configuration key, wherein the snapshot configuration is associated with the contract group associated with the clickwrap agreement; and
  associating the acceptance event with the snapshot configuration, which is associated with a plurality of snapshot records of which a last-captured snapshot record is chronologically closer after the snapshot time than any previously-generated snapshot record, and wherein the acceptance metadata corresponds to the snapshot metadata.

2. The computer-implemented method of claim 1, wherein the snapshot metadata comprises webpage information for the page, and wherein the end user computing platform comprises at least one of a mobile web browser, desktop browser, native mobile application, vehicle dashboard display, and smart television display.

3. The computer-implemented method of claim 1, wherein the contract group is associated with a plurality of snapshot configurations, wherein each of the plurality of snapshot configurations correspond to different combinations of snapshot metadata.

4. The computer-implemented method of claim 1, wherein the snapshot configuration key uniquely identifies the snapshot configuration corresponding to the clickwrap agreement from among a plurality of snapshot configurations stored at a snapshot server, and wherein the snapshot configuration key is an identifier that uniquely identifies the snapshot configuration.

5. The computer-implemented method of claim 1, wherein the acceptance metadata comprises a timestamp for when the end user accepts the clickwrap agreement, the method further comprising:
  calculating a time difference between the timestamp of the acceptance metadata and a timestamp of the snapshot metadata of the last-captured snapshot record associated with the identified snapshot configuration;
  determining that the calculated time difference is greater than the snapshot frequency of the identified snapshot configuration; and
  emulating the end user computing platform to initiate capture of a new snapshot record.

6. The computer-implemented method of claim 1, wherein the snapshot metadata comprises at least one parameter selected from: an operating system of the end user computing platform, snapshot timestamp, user agent information, screen viewport, universal resource locator (URL) of the page, screen resolution, native application name, native application version, and combination thereof.

7. The computer-implemented method of claim 1, wherein the graphical user interface with the clickwrap agreement requires login to access, and wherein the executing of the navigation instructions comprises:

passing an authorization token to the emulated end user computing platform to access the graphical user interface with the clickwrap agreement by inserting the authorization token in a header section of the page; and after the passing of the authorization token, pausing for a preset amount of time before performing the capturing of the snapshot image.

8. The computer-implemented method of claim 1, wherein the graphical user interface with the clickwrap agreement requires populating text in a textbox field and triggering a button control press; and wherein the navigation instructions in the parameters of the snapshot configuration include selectable commands via a commands builder; and wherein the selectable commands comprise at least a load URL command, a wait for selector command, and a click command.

9. The computer-implemented method of claim 1, wherein a contract group element comprises a snapshot configuration key and client-side scripting code embedded in the page configured to display the clickwrap agreement, and the storing the snapshot record in the data store comprises updating a last-captured timestamp of the snapshot configuration corresponding to the snapshot record.

10. The computer-implemented method of claim 1, wherein the snapshot configuration comprises a location where the snapshot configuration key was included on the page with the with clickwrap agreement at the snapshot time, wherein the location is a uniform resource locator (URL).

11. The computer-implemented method of claim 1, wherein the snapshot configuration further comprises a parameter for version identification configured to be used for A/B testing of the page, wherein A/B testing results in two end users visiting the same URL for the page receiving different layouts of the clickwrap agreement.

12. A system for recording an evidentiary history of a clickwrap agreement in a graphical user interface of an end user computing device by associating an acceptance event by an end user with a representative snapshot record comprising snapshot metadata and a snapshot image, the system comprising:
   (i) a data store configured to store:
      a contract group associated with the clickwrap agreement;
      a snapshot configuration associated with the contract group, the snapshot configuration including parameters comprising: a snapshot frequency, a type of an end user computing platform, and navigation instructions; and
      snapshot records comprising snapshot metadata and snapshot image, wherein the snapshot metadata includes at least a snapshot time;
   (ii) a snapshot server comprising one or more processors and a memory storing instructions that, when executed by the one or more processors, cause the snapshot server to:
      capture, based on the snapshot frequency of the snapshot configuration, the snapshot image of the graphical user interface displaying the clickwrap agreement on a webpage on an emulated end user computing platform executing the navigation instructions,
      generate a snapshot record comprising the snapshot image and snapshot metadata associated with the emulated end user computing platform adhering to the parameters of the snapshot configuration; and
      store the snapshot record in the data store; and
   (iii) the end user computing device comprising a processor and a computer memory storing instructions that, when executed by the processor, cause the end user computing device to:
      at a time after the snapshot time, receive an acceptance event in response to the end user accepting the clickwrap agreement on a page including the contract group element, wherein the acceptance event comprises acceptance metadata of the end user computing device; and
      associate the acceptance event with the snapshot configuration corresponding to a last-captured representative snapshot record of the snapshot records that are associated with the contract group, wherein the acceptance metadata corresponds to the snapshot metadata of the snapshot configuration.

13. The system of claim 12, wherein the last-captured snapshot record is chronologically closer after the snapshot time than any previously-generated snapshot record.

14. The system of claim 12, wherein the contract group element on the page, after rendered by the end user computing device, causes the graphical user interface of the end user computing device to send a notification of acceptance of the clickwrap agreement.

15. The system of claim 12, wherein the emulated end user computing platform is created by a virtual machine that emulates the end user computing platform in adherence with the parameters of the snapshot configuration.

16. The system of claim 12, wherein the data store is communicatively coupled to the snapshot server, and the snapshot metadata comprises, for example, at least one parameter selected from: snapshot timestamp, user agent information, screen viewport, universal resource locator (URL) of the page, screen resolution, native application name, native application version, and combination thereof.

17. The system of claim 12, wherein the graphical user interface with the clickwrap agreement requires populating text in a textbox field and triggering a button control press; and wherein the navigation instructions in the parameters of the snapshot configuration include selectable commands via a commands builder; and wherein the selectable commands comprise a load URL command, a wait for selector command, and a click command.

18. A system for recording proof of acceptance of a clickwrap agreement in a graphical user interface of an end user computing device, the system comprising:
   (i) a data store configured to store:
      a contract group associated with the clickwrap agreement;
      a snapshot configuration associated with the contract group, the snapshot configuration including parameters comprising: a type of an end user computing device, and at least one selected from a snapshot frequency and a triggering acceptance event for the clickwrap agreement; and
      a plurality of snapshot records comprising metadata and snapshot image, wherein the metadata includes at least a snapshot time; and
   (ii) the end user computing device comprising a processor and a computer memory storing instructions that, when executed by the processor, cause the end user computing device to:
      receive an acceptance event in response to the end user accepting the clickwrap agreement on a page including a snapshot configuration key, wherein the acceptance event comprises metadata of the end user computing device at the snapshot time;

capture, based on the snapshot configuration key, the snapshot image of a graphical user interface displaying the clickwrap agreement on the end user computing device;

generate a snapshot record comprising the snapshot image and the metadata; and send the snapshot record to the data store for storage.

19. The system of claim 18, wherein the snapshot image includes the graphical user interface displayed when the end user accepted the clickwrap agreement and not a representative snapshot image.

20. The system of claim 18, wherein the data store stores a plurality of snapshot configurations associated with the clickwrap agreement, and the snapshot configuration corresponding to the snapshot configuration key is unique.

* * * * *

UNITED STATES PATENT AND TRADEMARK OFFICE
CERTIFICATE OF CORRECTION

PATENT NO. : 11,593,132 B1
APPLICATION NO. : 17/731192
DATED : February 28, 2023
INVENTOR(S) : Parimal Rane et al.

It is certified that error appears in the above-identified patent and that said Letters Patent is hereby corrected as shown below:

In the Claims

Column 45, Claim 10, Line 27:
After "with the" delete "with"

Signed and Sealed this
Eighteenth Day of July, 2023

Katherine Kelly Vidal
*Director of the United States Patent and Trademark Office*